United States Patent
Monin et al.

(10) Patent No.: US 8,637,622 B2
(45) Date of Patent: Jan. 28, 2014

(54) COPOLYMER INCLUDING BETAINE UNITS AND HYDROPHOBIC AND/OR AMPHIPHILIC UNITS, METHOD FOR PREPARING SAME AND USES THEREOF

(75) Inventors: David Monin, Paris (FR); Marie-Pierre Labeau, Burlington, NJ (US); Chi-Thanh Vuong, Lognes (FR); Arnaud Cadix, Saint-ouen (FR); Denis Bendejacq, Paris (FR)

(73) Assignee: Rhodia Operations, Aubervilliers (FR)

( * ) Notice: Subject to any disclaimer, the term of this patent is extended or adjusted under 35 U.S.C. 154(b) by 793 days.

(21) Appl. No.: 12/594,558

(22) PCT Filed: Apr. 3, 2008

(86) PCT No.: PCT/EP2008/054024
§ 371 (c)(1), (2), (4) Date: Dec. 23, 2009

(87) PCT Pub. No.: WO2008/125512
PCT Pub. Date: Oct. 23, 2008

(65) Prior Publication Data
US 2010/0093874 A1    Apr. 15, 2010

(30) Foreign Application Priority Data
Apr. 5, 2007   (FR) ...................... 07 02497

(51) Int. Cl.
*C08F 12/30* (2006.01)
(52) U.S. Cl.
USPC .......................................................... 526/287
(58) Field of Classification Search
USPC .......................................................... 526/287
See application file for complete search history.

(56) References Cited

U.S. PATENT DOCUMENTS

| | | | |
|---|---|---|---|
| 3,225,074 A | 12/1965 | Cowen et al. | |
| 3,527,593 A | 9/1970 | Bland et al. | |
| 3,723,357 A | 3/1973 | Hansen | |
| 3,882,051 A | 5/1975 | Hansen | |
| 4,011,388 A * | 3/1977 | Murphy et al. | 526/320 |
| 4,107,328 A | 8/1978 | Michaels | |
| 4,117,107 A | 9/1978 | Shapiro et al. | |
| 4,122,159 A | 10/1978 | Madrange et al. | |
| 4,137,191 A | 1/1979 | Lohr | |
| 4,243,549 A | 1/1981 | Messenger et al. | |
| 4,452,732 A | 6/1984 | Bolich, Jr. | |
| 4,477,365 A | 10/1984 | Verboom et al. | |
| 4,585,846 A | 4/1986 | Schulz et al. | |
| 4,607,076 A | 8/1986 | Schulz et al. | |
| 4,650,848 A | 3/1987 | Schulz et al. | |
| 4,703,797 A | 11/1987 | Djabbarah | |
| 4,708,998 A | 11/1987 | Schulz et al. | |
| 4,742,135 A | 5/1988 | Schulz et al. | |
| 4,788,247 A | 11/1988 | Schulz et al. | |
| 4,822,847 A | 4/1989 | Schulz et al. | |
| 4,831,092 A | 5/1989 | Bock et al. | |
| 4,835,234 A | 5/1989 | Valint et al. | |
| 4,882,405 A | 11/1989 | Schulz et al. | |
| 4,996,045 A * | 2/1991 | Leighton et al. | 424/70.15 |
| 5,153,289 A | 10/1992 | Schulz et al. | |
| 5,164,120 A | 11/1992 | Borland et al. | |
| 5,180,414 A | 1/1993 | Darchy et al. | |
| 5,258,358 A | 11/1993 | Kocur et al. | |
| 5,292,942 A | 3/1994 | Aigner et al. | |
| 5,338,793 A | 8/1994 | Loftin | |
| 5,341,932 A | 8/1994 | Chen et al. | |
| 5,354,906 A | 10/1994 | Weitemeyer et al. | |
| 5,385,206 A | 1/1995 | Thomas | |
| 5,439,317 A | 8/1995 | Bishop et al. | |
| 5,464,806 A | 11/1995 | Kassebaum | |
| 5,551,516 A | 9/1996 | Norman et al. | |
| 5,580,856 A | 12/1996 | Prestrelski et al. | |
| 5,612,285 A | 3/1997 | Arnold | |
| 5,686,400 A | 11/1997 | Urfer et al. | |
| 5,700,760 A | 12/1997 | Magin et al. | |
| 5,703,016 A | 12/1997 | Magin et al. | |
| 5,747,416 A | 5/1998 | McArdle et al. | |
| 5,863,863 A | 1/1999 | Hasebe et al. | |
| 5,874,394 A | 2/1999 | Thomas et al. | |
| 5,877,143 A | 3/1999 | Abbas et al. | |
| 5,888,934 A | 3/1999 | Townson et al. | |
| 5,897,699 A | 4/1999 | Chatterji et al. | |

(Continued)

FOREIGN PATENT DOCUMENTS

| AU | 646915 | 10/1992 |
|---|---|---|
| CA | 2554335 | 12/2004 |

(Continued)

OTHER PUBLICATIONS

Ullmann's Encyclopedia of Industrial Chemistry, 5th Ed., vol. A 10, Edited by Gerhartz et al., pp. 176-177, Wiley-VCH Verlag GmbH & Co. KGaA, Weinheim, Germany, May 5, 1994.

"Application Guide for Household & Industrial Markets"; McIntyre Group Ltd., Copyright 2002, (Jan. 2003), obtained online @ http://www.dewolfchem.com/pdf/Mcintyre _HI&I_Application_Guide.pdf, (downloaded Mar. 6, 2012).

Surfactants by Albright & Wilson (Australia Limited CAN 004 234 137)—5 pp.

Empigen BB-AU alkyl betaine by Albright & Wilson Australia Limited (Incorporated in Victoria) Product Handling & Safety Bulletin—4 pp.

(Continued)

*Primary Examiner* — Ling Choi
*Assistant Examiner* — Lanee Reuther
(74) *Attorney, Agent, or Firm* — Hunton & Williams LLP

(57) ABSTRACT

The invention relates to a copolymer including betainine units and hydrophobic and/or amphiphile units. The invention also relates to a method for preparing a copolymer including betainine units and hydrophobic and/or amphiphile units, by controlled micellar polymerisation. The invention further relates to the uses of the copolymer. The copolymer is particularly used for increasing the viscosity of saline aqueous compositions.

23 Claims, 2 Drawing Sheets

(56) References Cited

U.S. PATENT DOCUMENTS

| | | | |
|---|---|---|---|
| 5,912,209 A | 6/1999 | Kassebaum | |
| 5,985,798 A | 11/1999 | Crudden | |
| 5,998,332 A | 12/1999 | Sato et al. | |
| 6,030,928 A * | 2/2000 | Stahl et al. | 507/121 |
| 6,036,638 A | 3/2000 | Nwawka | |
| 6,127,318 A | 10/2000 | Sato et al. | |
| 6,165,939 A | 12/2000 | Agbaje et al. | |
| 6,210,476 B1 | 4/2001 | Chatterji et al. | |
| 6,284,854 B1 | 9/2001 | Bowers et al. | |
| 6,288,010 B1 | 9/2001 | Rose et al. | |
| 6,302,209 B1 | 10/2001 | Thompson, Sr. et al. | |
| 6,329,322 B1 | 12/2001 | Reierson | |
| 6,346,588 B1 | 2/2002 | Fenchl et al. | |
| 6,369,122 B1 | 4/2002 | Subramanyam | |
| 6,376,566 B1 | 4/2002 | Bergeron et al. | |
| 6,407,042 B1 | 6/2002 | Ward et al. | |
| 6,417,268 B1 | 7/2002 | Zhang et al. | |
| 6,432,878 B1 | 8/2002 | Brigance | |
| 6,432,884 B1 | 8/2002 | Lachut | |
| 6,451,731 B1 | 9/2002 | Agbaje et al. | |
| 6,500,784 B1 | 12/2002 | Mille | |
| 6,566,408 B1 | 5/2003 | Cotrell et al. | |
| 6,642,178 B2 | 11/2003 | Woznica et al. | |
| 6,645,912 B1 | 11/2003 | Mille et al. | |
| 6,645,914 B1 | 11/2003 | Woznica et al. | |
| 6,653,257 B2 | 11/2003 | Mille | |
| 6,770,268 B1 | 8/2004 | Hall et al. | |
| 6,770,594 B2 | 8/2004 | Bickers et al. | |
| 6,831,108 B2 | 12/2004 | Dahanayake et al. | |
| 6,992,046 B2 | 1/2006 | Bramati et al. | |
| 7,135,437 B2 | 11/2006 | Pallas et al. | |
| 7,316,990 B2 | 1/2008 | Tank et al. | |
| 8,236,730 B2 | 8/2012 | Bramati et al. | |
| 8,263,529 B2 | 9/2012 | Suzuki et al. | |
| 8,383,137 B2 | 2/2013 | Modaressi et al. | |
| 2002/0187917 A1 | 12/2002 | Lazarowitz | |
| 2003/0118540 A1 | 6/2003 | Charlton et al. | |
| 2003/0158042 A1 | 8/2003 | Bramati et al. | |
| 2004/0097372 A1 | 5/2004 | Abraham et al. | |
| 2004/0110644 A1 | 6/2004 | Halliday et al. | |
| 2004/0121917 A1 | 6/2004 | Pakulski | |
| 2004/0224846 A1 | 11/2004 | Bramati et al. | |
| 2005/0003965 A1 | 1/2005 | Xiao et al. | |
| 2005/0010009 A1* | 1/2005 | Schultz et al. | 526/287 |
| 2005/0020454 A1 | 1/2005 | Francini et al. | |
| 2005/0130842 A1 | 6/2005 | Fleute-Schlachter | |
| 2005/0170965 A1 | 8/2005 | Bramati et al. | |
| 2006/0019830 A1 | 1/2006 | Xu et al. | |
| 2006/0058193 A1 | 3/2006 | Bramati et al. | |
| 2006/0060354 A1 | 3/2006 | Lewis et al. | |
| 2007/0155628 A1 | 7/2007 | Pazhianur et al. | |
| 2007/0282075 A1* | 12/2007 | Koch et al. | 525/329.5 |
| 2008/0103047 A1 | 5/2008 | Gioia et al. | |
| 2008/0312083 A1 | 12/2008 | Gioia et al. | |
| 2009/0018018 A1 | 1/2009 | Gioia et al. | |
| 2010/0069269 A1 | 3/2010 | Prat et al. | |
| 2010/0140531 A1 | 6/2010 | Prat et al. | |
| 2010/0279869 A1 | 11/2010 | Bramati et al. | |
| 2011/0009269 A1 | 1/2011 | Gioia et al. | |
| 2011/0015071 A1 | 1/2011 | Kisenwether et al. | |
| 2012/0040833 A1 | 2/2012 | Kisenwether et al. | |
| 2012/0165195 A1 | 6/2012 | Iskandar et al. | |

FOREIGN PATENT DOCUMENTS

| | | |
|---|---|---|
| EP | 0370338 | 5/1990 |
| EP | 0373851 A2 | 6/1990 |
| EP | 0274369 B1 | 9/1990 |
| EP | 0483095 A2 | 4/1992 |
| EP | 0508022 A1 | 10/1992 |
| EP | 0573118 A2 | 12/1993 |
| EP | 0449159 B1 | 7/1995 |
| EP | 0810239 | 12/1997 |
| JP | 10183176 | 7/1998 |
| JP | 11-349826 | 12/1999 |
| WO | 1992012637 | 8/1992 |
| WO | 92/14907 | 9/1992 |
| WO | 97/01281 | 1/1997 |
| WO | 1997006230 | 2/1997 |
| WO | 97/36489 | 10/1997 |
| WO | 98/14060 | 4/1998 |
| WO | WO 9903895 | 1/1999 |
| WO | 99/15610 | 4/1999 |
| WO | 99/45780 | 9/1999 |
| WO | 99/62338 | 12/1999 |
| WO | 00/38523 | 7/2000 |
| WO | 00/67571 | 11/2000 |
| WO | 00/67573 | 11/2000 |
| WO | 01/08482 | 2/2001 |
| WO | 01/17358 | 3/2001 |
| WO | 01/26463 | 4/2001 |
| WO | 01/26469 | 4/2001 |
| WO | 2001089302 | 11/2001 |
| WO | 02/26036 | 4/2002 |
| WO | 03/013241 | 2/2003 |
| WO | 03/049813 | 6/2003 |
| WO | 04/107861 | 12/2004 |
| WO | 2004107862 | 12/2004 |
| WO | 2007003112 | 1/2007 |

OTHER PUBLICATIONS

Basheva et al.; *Role of Betaine as Foam Booster in the Presence of Silicone Oil Drops*; Langmuir 2000, 16, 1000-1013; Received Jun. 16, 1999; 2000 American Chemical Society Published on Web Dec. 8, 1999.

* cited by examiner

COPOLYMER INCLUDING BETAINE UNITS AND HYDROPHOBIC AND/OR AMPHIPHILIC UNITS, METHOD FOR PREPARING SAME AND USES THEREOF

CROSS-REFERENCE TO RELATED APPLICATIONS

This application is the U.S. National Phase Application of International Application No. PCT/EP2008/054024, filed Apr. 3, 2008, which claims the benefit of French Application No. FR 07 02497, filed Apr. 5, 2007.

FIELD OF THE INVENTION

A subject matter of the present invention is a copolymer exhibiting betaine units and hydrophobic and/or amphiphilic units. The present invention also relates to a process for the preparation of a copolymer exhibiting betaine units and hydrophobic and/or amphiphilic units by controlled micellar polymerization. The present invention also relates to uses of the copolymer. The copolymer makes it possible in particular to increase the viscosity of saline aqueous compositions.

BACKGROUND

Industry uses numerous rheology-modifying agents, in particular thickening agents, in varied compositions. These agents are generally chosen so as to be able to thicken a given composition and to confer, on said composition, a specific rheological behavior, for example a certain threshold, a viscoelasticity, a thixotropy, a shear-thinning behavior, a heat-thickening behavior, a newtonian behavior, a non-newtonian behavior, and the like.

Use is frequently made, among thickening agents, of polymers. A great variety of them exist and the choice is generally made of a polymer suited to the composition whose rheology is to be modified, in order to confer the desired properties on it, if appropriate by physical and/or chemical interaction with other compounds. Many polymers are thus used in cosmetic compositions to confer, on the compositions, an appropriate stability and/or a viscosity and a texture which are appreciated by consumers. Some compositions can exhibit a high ionic strength and/or comprise a large amount of salts. In the construction and civil engineering field, attempts are often made to modify the viscosity of compositions or fluids, in particular in underground uses, where the presence of liquids may be a hindrance, in particular in tunnel construction, digging and/or excavation operations. Many fluids are employed in the field of the exploitation of oil and/or gas fields and are either prepared outside the geological formation being exploited or are formed in the formation with a liquid present in the formation. Fluids are thus used in particular during drilling, stimulation and production operations. These fluids very often require a highly specific rheology, with a greater viscosity than that of water. These issues are known in this field. The fluids may exhibit a high ionic strength and/or comprise relatively large amounts of salts; they can in particular be based on seawater or brines present in the geological formations.

There exists a constant need for novel polymers which can vary the rheological properties of different fluids, in particular in the presence of salts and/or at a relatively high ionic strength. It should be noted that it is generally important for the polymers to be stable in the fluid or of controllable stability, that is to say for them not to separate from the other constituents, so that in particular the rheological properties are retained for the desired time. It should also be noted that it is sometimes important for the rheological properties to be obtained under specific conditions, for example under severe conditions of temperature and/or pressure. This may be the case in particular for fluids employed in certain underground operations, for example in the context of the exploitation of oil and/or gas fields. This can also be the case in the context of the use of some industrial manufacturing processes.

Copolymers comprising units comprising a betaine group are known.

The document U.S. Pat. No. 6,346,588 (SKW) describes terpolymers of from 1 to 75 mol % of units deriving from a sulfobetaine, from 5 to 79% of units deriving from acrylamide (AM) and from 20 to 94% of units of hydroxyethyl methacrylate (HEMA) type. All these units are hydrophilic units. The terpolymers exhibit thickening effects on saline media.

The documents U.S. Pat. No. 4,742,135, U.S. Pat. No. 4,650,848 and/or U.S. Pat. No. 4,882,405 (Exxon) describe terpolymers of from 1 to 30 mol % of units deriving from a sulfobetaine, from 70 to 95% of units deriving from acrylamide (AM) and from 0.1 to 5% of hydrophobic units deriving from alkylacrylamide. The polymerization is carried out in the presence of large amounts of surfactant (SDS) not making it possible to obtain groups of the hydrophobic units. Furthermore, the polymerization proves to be difficult to reproduce. The terpolymers exhibit thickening effects on saline media.

The document U.S. Pat. No. 4,788,247 (Exxon) describes terpolymers of from 1 to 30 mol % of units deriving from a sulfobetaine, from 70 to 95% of units deriving from acrylamide (AM) and from 0.1 to 5% of hydrophobic units deriving from an ethoxylated alcohol acrylate. The polymerization is carried out in the presence of large amounts of surfactant (SDS) not making it possible to obtain groups of the hydrophobic units. Furthermore, the polymerization proves to be difficult to reproduce. The terpolymers exhibit thickening effects on saline media.

The documents U.S. Pat. No. 4,607,076 and/or U.S. Pat. No. 5,153,289 (Exxon) describe copolymers of units deriving from a sulfobetaine and of units deriving from vinylpyrrolidone (VP). All these units are hydrophilic units. The copolymers exhibit thickening effects on saline media.

The documents U.S. Pat. No. 4,585,846, U.S. Pat. No. 4,822,847 and/or U.S. Pat. No. 4,708,998 (Exxon) describe copolymers of units deriving from a sulfobetaine having a special structure and of units deriving from vinylpyrrolidone (VP). All these units are hydrophilic units. The copolymers exhibit thickening effects on saline media.

The document U.S. Pat. No. 6,284,854 (Biocompatibles) describes copolymers of from 10 to 50 mol % of units deriving from sulfobetaines and from 50 to 90% of hydrophobic units. These copolymers are used as biocompatible coatings. The polymerizations are carried out in solution, which does not make it possible to obtain groups of the hydrophobic units.

The document "Hydrophobically Modified Acrylamide-Based Polybetaines. I. Synthesis, Characterization and Stimuli-Responsive Solution Behavior", M. Johnson et al., Journal of Applied Polymer Science, Volume 92, Issue 1, pp. 647-657 (2004), describes terpolymers of units deriving from certain sulfobetaines, of acrylamide and of N-butylphenylacrylamide (BPAM). The terpolymers are prepared by micellar polymerization. The polymerization is carried out in the presence of large amounts of surfactant (SDS) not making it possible to obtain significant groups of the hydrophobic units (value of $n_H$ of 2.1).

Micellar radical polymerization processes which make it possible to polymerize, in a hydrophilic macromolecular chain, units deriving from hydrophobic monomers are also known.

The documents U.S. Pat. No. 4,831,092 and/or U.S. Pat. No. 4,835,234 (Exxon) describe a process for the micellar polymerization of certain monomers. The process is carried out batchwise.

The documents EP 1 250 360 and/or U.S. Pat. No. 417,268 (Hercules) describe a process for the micellar polymerization of certain monomers. These documents describe a series of special stages for the preparation of the reaction medium but the polymerization is carried out batchwise.

The document WO 99/03895 (Rhodia) describes a process for the micellar polymerization of certain monomers. The process comprises the prior preparation of a starting charge comprising hydrophilic monomers and micelles of hydrophobic monomers. A solution of initiator and another solution comprising other hydrophilic monomers and micelles of hydrophobic monomers are then added continuously.

The need remains for novel polymers exhibiting modified properties, in particular:
- good stability at a relatively high ionic strength, in particular a relatively saline medium,
- good thickening power for media comprising a relatively high ionic strength, in particular saline media, indeed even highly saline media,
- good retention of the stability and/or thickening at relatively high temperature, and/or
- a thickening power at low contents of polymer,
- an improved combination and/or compromise of at least two of these properties.

A need also remains for processes for the preparation of copolymers which are improved and/or which can exhibit at least one of the properties mentioned above.

SUMMARY OF THE INVENTION

The invention satisfies at least one of the needs expressed above by providing a copolymer comprising:
- a macromolecular chain A comprising units $A_Z$ comprising a betaine group, the betaine group comprising a cationic group and an anionic group, and optionally other hydrophilic units $A_{other}$,
- at least one group B of hydrophobic units B ($B_{phobic}$) and/or amphiphilic units B ($B_{amphi}$), provided that, if the group B comprises only hydrophobic units ($B_{phobic}$), then the number $n_H$ of hydrophobic units in the group B is greater than or equal to 2.6, preferably greater than or equal to 3, preferably greater than or equal to 5, preferably greater than or equal to 10.

The invention also provides a process for the preparation of a copolymer comprising:
- units $A_Z$ comprising a betaine group, the betaine group comprising a cationic group and an anionic group, and optionally other hydrophilic units $A_{other}$, and
- at least one group B of hydrophobic units B ($B_{phobic}$) and/or amphiphilic units B ($B_{amphi}$), said process being a process comprising the following stages:
a) an aqueous fluid B is prepared
  the aqueous fluid B comprising:
    at least one ethylenically unsaturated monomer B which is hydrophobic ($B_{phobic}$) and/or amphiphilic ($B_{amphi}$), and
    optionally a surfactant,
    with the condition that, if the monomer B is a hydrophobic monomer $B_{phobic}$, then the aqueous fluid B comprises a surfactant,
  the monomer B being included in micelles of surfactant and/or of amphiphilic monomer $B_{amphi}$,
  with at least one of the following conditions:
    the number $n_H$ of monomers in the micelles is greater than 2.6, preferably greater than or equal to 3, preferably greater than or equal to 5, preferably greater than or equal to 10, and/or
    the ratio in moles of the surfactant to the monomer B is less than or equal to 28, preferably less than or equal to 20, preferably less than or equal to 15, preferably less than or equal to 10, preferably less than or equal to 7, and/or
    the ratio by weight of the surfactant, if it is present, to the monomer B is less than or equal to 30, preferably less than or equal to 20, preferably less than or equal to 15, preferably less than or equal to 10, preferably less than or equal to 7, b) polymerization is carried out by bringing together, in an aqueous medium:
  the micelles of the aqueous fluid B,
  monomers $A_Z$ or $A_{Z\ precursor}$ and optionally other hydrophilic monomers $A_{other}$, these monomers being in solution in the aqueous medium, the monomers $A_Z$ being monomers comprising a betaine group, the monomers $A_{Z precursor}$ being monomers comprising a group capable of being used to form betaine groups $A_Z$ by a reaction subsequent to the polymerization, and
  a source of free radicals, and c) optionally, if monomers $A_{Z\ precursor}$ have been employed during stage b), the units deriving from these monomers are reacted so as to form betaine groups $A_Z$.

The invention also relates to the copolymer capable of being obtained by the process.

The invention also provides uses of such copolymers, in particular as agent for modifying the rheology, in particular as thickening agent, of an aqueous solution, in particular of a solution with a relatively high ionic strength. The invention also relates to a process for modifying, in particular thickening, aqueous compositions, in particular those with a relatively high ionic strength, which can in particular comprise salts, by addition of the copolymer.

The invention also relates to aqueous compositions comprising the copolymer and preferably also compounds which increase the ionic strength, in particular salts.

The invention also relates to fluids, in particular fluids employed in the exploitation of oil and/or gas fields, comprising such copolymers and preferably also compounds which increase the ionic strength, in particular salts. The invention also relates to processes employed in the exploitation of oil and/or gas fields comprising a stage in which a fluid as mentioned above is employed, for example a circulation or placement.

DETAILED DESCRIPTION OF PREFERRED EMBODIMENTS

Definitions

Figure 1:
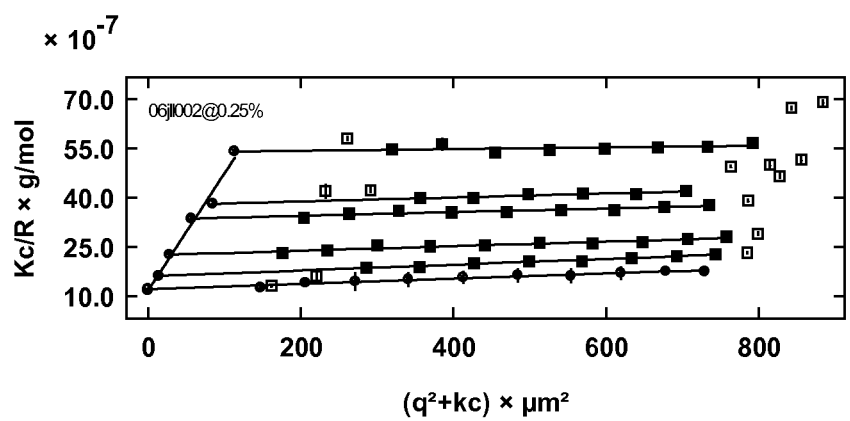
FIG. 1 depicts the Zimm plot obtained for the polymer of Example 1.

In the present patent application, unit deriving from a monomer denotes, for the units other than the $A_{Z\ precursor}$ units, a unit which can be obtained directly from said monomer by polymerization. Thus, for example, a unit deriving from an acrylic or methacrylic acid ester does not cover a unit of formula $-CH_2-CH(COOH)-$, $-CH_2-C(CH_3)(COOH)-$ or $-CH_2-CH(OH)-$, respectively, for example obtained by polymerizing an acrylic or methacrylic acid ester or vinyl acetate, respectively, and by then hydrolyzing. A unit deriving from acrylic or methacrylic acid covers, for example, a unit obtained by polymerizing a monomer (for example an acrylic or methacrylic acid ester) and by then reacting (for example by hydrolysis) the polymer obtained so as to obtain units of formula $-CH_2-CH(COOH)-$ or $-CH_2-C(CH_3)(COOH)-$. A unit deriving from a vinyl alcohol covers, for example, a unit obtained by polymerizing a monomer (for example a vinyl ester) and by then reacting (for example by hydrolysis) the polymer obtained so as to obtain units of formula $-CH_2-CH(OH)-$. Units deriving from a monomer $A_Z$ may, for example, have been obtained by polymerization of monomers $A_{Z\ precursors}$ followed by a post-polymerization reaction in order to obtain units comprising the betaine group. The units $A_Z$ are not regarded as units deriving from monomers $A_{Z\ precursors}$ not comprising a betaine group.

In the present patent application, the term "hydrophobic" is used in its normal sense of "which does not have an affinity for water"; this means that the organic polymer of which it is composed, taken alone (with the same composition or the same molar mass), would form a two-phase macroscopic solution in distilled water at 25° C., at a concentration of greater than 1% by weight.

In the present patent application, the terms "hydrophilic", "water-soluble" and "water-dispersable" are also used in their normal sense of "which has an affinity for water", that is to say is not capable of forming a two-phase macroscopic solution in distilled water at 25° C. at a concentration of greater than 1% by weight.

Cationic or potentially cationic units $A_C$ is understood to mean units which comprise a cationic or potentially cationic group. Cationic units or groups are units or groups which exhibit at least one positive charge (generally in combination with one or more anions, such as a chloride ion, a bromide ion, a sulfate group or a methyl sulfate group), whatever the pH of the medium into which the copolymer is introduced. Potentially cationic units or groups are units or groups which may be neutral or may exhibit at least one positive charge, according to the pH of the medium into which the copolymer is introduced. In this case, reference will be made to potentially cationic units in the neutral form or in the cationic form. By extension, it is possible to speak of cationic or potentially cationic monomers.

Anionic or potentially anionic units $A_A$ is understood to mean units which comprise an anionic or potentially anionic group. Anionic units or groups are units or groups which exhibit at least one negative charge (generally in combination with one or more cations, such as cations of alkali metal or alkaline earth metal compounds, for example sodium, or with one or more cationic compounds, such as ammonium), whatever the pH of the medium where the copolymer is present. Potentially anionic units or groups are units or groups which may be neutral or may exhibit at least one negative charge, according to the pH of the medium where the copolymer is present. In this case, reference will be made to potentially anionic units $A_A$ in the neutral form or in the anionic form. By extension, it is possible to speak of anionic or potentially anionic monomers.

Neutral units $A_N$ is understood to mean units which do not exhibit a charge, whatever the pH of the medium where the copolymer is present.

In the present patent application, unless otherwise indicated, when reference will be made to molar mass, it will relate to the absolute weight-average molar mass, expressed in g/mol. This can be determined by aqueous gel permeation chromatography (GPC), by light scattering (LS or MALLS for an aqueous eluent), with an aqueous eluent or an organic eluent (for example formamide), according to the composition of the polymer.

In the present patent application, unless otherwise mentioned, the amounts and proportions are indicated as active material (in contrast to diluted or dispersed material) and by weight.

During a micellar polymerization, micelles comprising hydrophobic monomers ($B_{phobic}$) and/or amphiphilic monomers ($B_{amphi}$) are formed in an aqueous fluid. The number of monomers in these micelles is recorded as $n_H$. The micelles can be micelles of a nonpolymerizable surface-active compound, with a hydrophobic monomer ($B_{phobic}$) and/or an amphiphilic monomer ($B_{amphi}$) included inside the micelles. The micelles can be composed of an amphiphilic monomer which forms micelles by self-association at the amount at which it is used, said micelles not additionally comprising hydrophobic monomer. The micelles can be composed of an amphiphilic monomer ($B_{amphi}$) which forms micelles by self-association at the amount at which it is used, said micelles additionally comprising internally a hydrophobic monomer. The micelles can comprise a nonpolymerizable surfactant and an amphiphilic monomer ($B_{amphi}$), the combination of which makes it possible to form micelles (comicellization), said micelles not additionally comprising hydrophobic monomer. The micelles can comprise a nonpolymerizable surfactant and an amphiphilic monomer ($B_{amphi}$), the combination of which makes it possible to form micelles (comicellization), said micelles additionally comprising internally a hydrophobic monomer ($B_{phobic}$). The number $n_H$ corresponds to the total number of hydrophobic monomers ($B_{phobic}$) in the micelle, when the micelle comprises only hydrophobic monomers ($B_{phobic}$).

The number $n_H$ can be evaluated as taught in the document P. Kujawa, J. M. Rosiak, J. Selb and F. Candau, *Macromolecular Chem. & Physics*, 202, 8, 1384-1397, 2001:

$$n_H = \frac{[\text{monomer}] \times N_{agg}}{[\text{surfactant}] - CMC}$$

where:
- [monomer] is the (molar) concentration of hydrophobic and/or amphiphilic monomer
- $N_{agg}$ is the aggregation number of the surfactant
- [surfactant] is the (molar) concentration of surfactant or the sum of the molar concentrations of surfactant and of amphiphilic monomer, if the latter participates in the formation of the micelle,
- CMC is the critical micelle concentration (molar) of the surfactant or of the amphiphilic monomer or of the combination of the amphiphilic monomer and of the surfactant, if the surfactant monomer participates in the formation of the micelle.

The critical micelle concentrations and the aggregation numbers are most often known in the literature. Alternatively, they can be evaluated by the protocol described in P. Becher, J. Colloid Sci., 16, 49, 1961.

Mention is in particular made, as values of use in the determination of some $n_H$ values, of:
Molar masses:
  Sodium dodecyl sulfate ("SDS"): MW SDS=288 g/mol
  Lauryl methacrylate=254 g/mol
CMC and aggregation number of sodium dodecyl sulfate
  CMC SDS=0.007 mol/l=0.2% by weight
  $N_{agg}$ SDS=62
  Reference: "Remove detergent from protein samples" TECHNICAL RESOURCE TR0019.0
  PIERCE, 3747 N. Meridian Road
  P.O. Box 117
  Rockford, Ill. 61105

It may be considered that the number of hydrophobic and/or amphiphilic units of a group B is equal on average to the number of monomers included in a micelle, said micelles being formed with implementation of a controlled micellar polymerization. However, it is not out of the question to carry out other types of polymerization, for example radical sequential polymerizations, preferably with at least 3 sequences, preferably at least 5 sequences, in a controlled manner, the number $n_H$ of monomers involved per macromolecular chain during the relevant sequences being known.

Copolymer

The copolymer of the invention comprises:
- a macromolecular chain A comprising units $A_Z$ comprising a betaine group, the betaine group comprising a cationic group and an anionic group, and optionally other hydrophilic units $A_{other}$;
- at least one group B of hydrophobic units ($B_{phobic}$) and/or amphiphilic units ($B_{amphi}$).

If the group B comprises only hydrophobic units ($B_{phobic}$), then the number $n_H$ of hydrophobic units in the group B is greater than or equal to 2.6, preferably greater than or equal to 3, preferably greater than or equal to 5, preferably greater than or equal to 10.

The macromolecular chain A is typically a linear macromolecular chain of the units comprising the betaine group and of the optional other hydrophilic units. This macromolecular chain is interrupted by (or interspersed with) groups B of hydrophobic and/or amphiphilic units. The groups B with the macromolecular chain A typically form a linear macromolecular chain, referred to as a "complete chain". Such a macromolecular chain ("complete chain") can typically be obtained by controlled micellar polymerization. The number of units of the groups B is recorded as $n_H$. This number can be varied according to the process chosen and the operating conditions chosen (in particular by the amounts and ratios of the monomers used and/or by the natures, amounts and ratios of surfactants used during the polymerization process). The number of groups B can also be varied according to the process chosen and operating conditions chosen (in particular by the amounts and ratios of the monomers and/or initiators used and/or by the natures, amounts and ratios of surfactants used during the polymerization process).

The units $A_Z$ comprising a betaine group and optionally the other hydrophilic units $A_{other}$ preferably form a macromolecular chain A comprising a polyalkylene hydrocarbon chain optionally interrupted by one or more nitrogen or sulfur atoms (such atoms may not interrupt the macromolecular chain). The complete chain preferably forms a macromolecular chain comprising a polyalkylene hydrocarbon chain optionally interrupted by one or more nitrogen or sulfur atoms (such atoms may not interrupt the macromolecular chain). The optionally interrupted polyalkylene hydrocarbon chain is comparable to a backbone of the macromolecular chains, said macromolecular chains generally comprising pendant (side) groups of the various units, in particular betaine groups.

The groups B, generally in a number greater than or equal to 2 (there are several), can typically interrupt the macromolecular chain A in a random fashion. Thus, along the complete chain, the groups B, separated by the units constituting the macromolecular chain A, can be more or less spaced out from one another, the distribution of the spacings being typically random. It should be noted that groups B can be present at the end of the complete chain. However, this is not particularly desirable and often the groups B will not be present at the end of the complete chain (more than 50% by weight of the complete chains do not comprise groups B at the chain end).

The number of groups B can in particular be greater than or equal to 2, preferably greater than or equal to 3, for example greater than or equal to 5 or even 10. The complete chain can in particular thus resemble a multiblock chain with a block number greater than or equal to 4, preferably greater than or equal to 5, preferably greater than or equal to 6, for example greater than or equal to 9 or 10 or 11, or even greater than or equal to 19 or 20 or 21.

The macromolecular chain A is typically water-soluble, that is to say that a polymer composed solely of the units of the macromolecular chain A, without the groups B, with a similar average molecular weight (for example obtained under the same polymerization conditions, in particular with even an initiator/monomers ratio with the same operating conditions), would be water-soluble (at 25° C. and at 1% by weight).

The number $n_H$ is preferably less than 100, preferably less than 50, preferably less than 25. It can, for example, be between 3 and 50, preferably between 5 and 30, for example between 10 and 25.

Units $A_Z$

The betaine group of the units $A_Z$ comprises an anionic group and a cationic group. The anionic group can in particular be a carbonate group, a sulfur-comprising group, such as a sulfonate group, a phosphorus-comprising group, such as a phosphate, phosphonate or phosphinate group, or an ethanolate group. Preferably, it is a sulfonate group. The cationic group can be an onium group or an inium group of the nitrogen, phosphorus or sulfur family, for example an ammonium, pyridinium, imidazolinium, phosphonium or sulfonium group. Preferably, it is an ammonium group (preferably a quaternary ammonium group). The betaine group can in particular be a sulfobetaine or phosphobetaine or carboxybetaine group. The copolymers comprising a carboxybetaine group generally exhibit high contents of counterions (salts present, related to the process for the preparation of these groups); thus the synthesis thereof may be rendered less practical and/or the effectiveness thereof may be reduced. Advantageously, the betaine group is a sulfobetaine group comprising a sulfonate group and a quaternary ammonium group. It should be noted that it would not be departing from the scope of the invention to combine several different betaine groups, by combining several different units $A_Z$ in the copolymer.

The betaine groups are typically pendant groups of the copolymer, typically obtained from monomers comprising at least one ethylenic unsaturation.

Within the units $A_Z$, the number of positive charges is equal to the number of negative charges. The units $A_Z$ are electrically neutral, in at least one pH range.

Useful betaine groups can be represented, in the case of the cations of the nitrogen family, by the following formulae (I) to (V), exhibiting a cationic charge at the center of the functional group and an anionic charge at the end of the functional group, and the following formula (VI), exhibiting an anionic charge at the center of the functional group and a cationic charge at the end of the functional group:

$$—N^{(+)}(R^1)(R^2)—R-A-O^{(-)} \quad (I)$$

$$—(R^3)C=N^{(+)}(R^4)—R-A-O^{(-)} \quad (II)$$

$$—(R^3)(R)C—N^{(+)}(R^4)(R^5)—R-A-O^{(-)} \quad (III)$$

$$—N^{(+)}(=R^6)—R-A-O^{(-)} \quad (IV)$$

$$—R-A'(—O^{(-)})—R—N^{(+)})(R^1)(R^2)(R^7) \quad (V)$$

in which formulae (I) to (IV):
  the symbols $R^1$, $R^2$ and $R^5$, which are alike or different, represent an alkyl radical comprising from 1 to 7 carbon atoms, preferably 1 or 2 carbon atoms,
  the symbols $R^3$ and $R^4$ represent hydrocarbon radicals forming, with the nitrogen atom, a nitrogenous heterocycle optionally comprising one or more other heteroatoms, in particular of nitrogen,
  the symbol $R^6$ represents a hydrocarbon radical forming, with the nitrogen atom, a saturated or unsaturated nitrogenous heterocycle optionally comprising one or more other heteroatoms, in particular of nitrogen,
  the symbol R represents a linear or branched alkylene radical comprising from 1 to 15 carbon atoms, preferably from 2 to 4 carbon atoms, optionally substituted by one or more hydroxyl groups, or a benzylene radical,
  the symbol A represents S(=O)(=O), OP(=O)(=O), OP(=O)(OR'), P(=O)(OR') or P(=O)(R'), where R' represents an alkyl radical comprising from 1 to 7 carbon atoms or a phenyl radical,
in which formula (V):
  the symbols $R^1$ and $R^2$ have the definitions given above,
  the symbol $R^7$, which is the same as or different from $R^1$ or $R^2$, represents an alkyl radical comprising from 1 to 7 carbon atoms, preferably from 1 to 2 carbon atoms,
  the symbol A' represents —O—P(=O)—O—.

In the case of cations of the phosphorus family, mention may be made of the betaine groups of formulae (VI) and (VII):

$$—P^{(+)}(R^1)(R^2)—R-A-O^{(-)} \quad (VI)$$

$$—R-A'(—O^{(-)})—R—P^{(+)}(R^1)(R^2)(R^7) \quad (VII)$$

in which formula (VI) the symbols $R^1$, $R^2$, R and A have the definitions given above,
in which formula (VII):
  the symbols $R^1$, $R^2$, $R^7$ and R have the definitions given above,
  the symbol A' represents —O—P(=O)—O—.

In the case of cations of the sulfur family, mention may be made of the betaine groups of formulae (VIII) and (IX):

$$—S^{(+)}(R^1)—R-A-O^{(-)} \quad (VIII)$$

$$—R-A'(—O^{(-)})—R—S^{(+)}(R^1)(R^2) \quad (IX)$$

in which formula (VIII) the symbols $R^1$, R and A have the definitions given above,
in which formula (IX):
  the symbols $R^1$, $R^2$ and R have the definitions given above,
  the symbol A' represents —O—P(=O)—O—.

The betaine groups can be connected to the carbon atoms of a macromolecular chain A of the copolymer via in particular a divalent or polyvalent hydrocarbon unit (for example an alkylene or arylene unit), optionally interrupted by one or more heteroatoms, in particular of oxygen or of nitrogen, an ester unit or an amide unit, or else by a valence bond.

The copolymer can in particular be obtained by radical polymerization
  of monomers $A_Z$ comprising an ethylenically unsaturated betaine group, in particular of ethylenically unsaturated monomers carrying at least one betaine group of formulae (I) to (IX) above,
  and of other monomers, comprising monomers B (monomers $B_{phobic}$ and/or $B_{amphi}$) from which the hydrophobic units B ($B_{phobic}$) and/or amphiphilic units B ($B_{amphi}$) of the groups B will be derived, and optionally of other monomers $A_{other}$ from which the optional hydrophilic units $A_{other}$ of the macromolecular chains A will be derived.

Said monomers $A_Z$ can exhibit, by way of example:
  one or more mono- or polyethylenically unsaturated hydrocarbon radicals (in particular vinyl, allyl or styryl radicals, and the like),
  one or more mono- or polyethylenically unsaturated ester radicals (in particular acrylate, methacrylate or maleate radicals, and the like), and/or
  one or more mono- or polyethylenically unsaturated amide radicals (in particular acrylamido or methacrylamido radicals, or the like).

The units $A_Z$ can derive from at least one betaine monomer $A_Z$ selected from the group consisting of the following monomers:
  alkylsulfonates or -phosphonates of dialkylammonioalkyl acrylates or methacrylates, -acrylamides or -methacrylamides, such as:
  sulfopropyldimethylammonioethyl methacrylate, sold by Raschig under the name SPE:

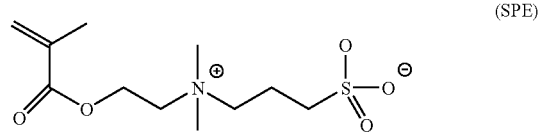

(SPE)

sulfoethyldimethylammonioethyl methacrylate and sulfobutyldimethylammonioethyl methacrylate:

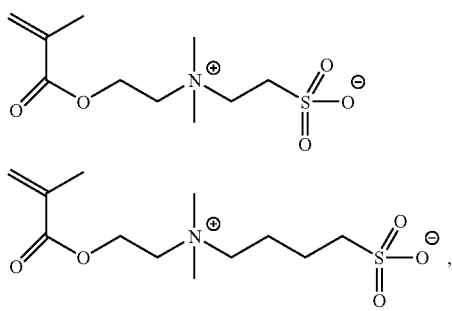

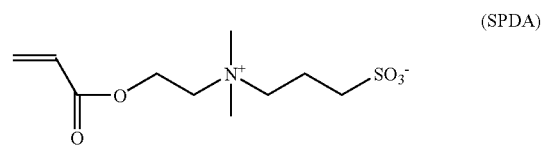

sulfohydroxypropyldimethylammoniopropylmethacrylamide:

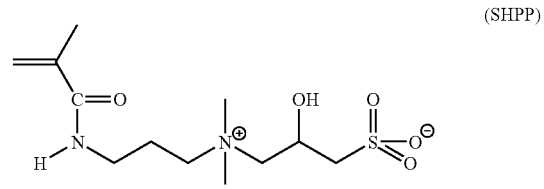 [SMILES: C=C(C)C(=O)NCCC[N+](C)(C)CC(O)CS(=O)(=O)[O-]]

the synthesis of which is described in the paper "Sulfobetaine zwitterionomers based on n-butyl acrylate and 2-ethoxyethyl acrylate: monomer synthesis and copolymerization behavior", Journal of Polymer Science, 40, 511-523 (2002), sulfohydroxypropyldimethylammonioethyl methacrylate:

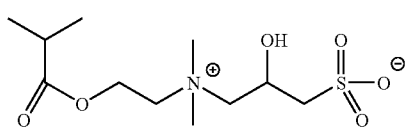

sulfopropyldiethylammonioethyl methacrylate:

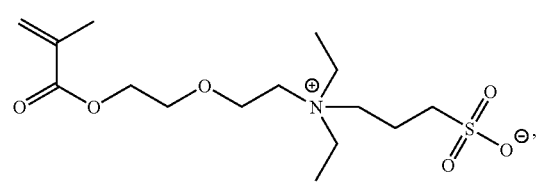 [SMILES: C=C(C)C(=O)OCCOCC[N+](CC)(CC)CCCS(=O)(=O)[O-]]

sulfopropyldimethylammoniopropylacrylamide:

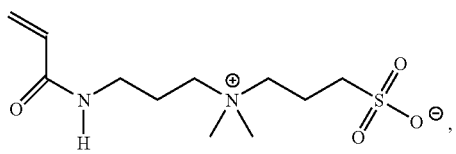

the synthesis of which is described in the paper "Synthesis and solubility of the poly(sulfobetaine)s and the corresponding cationic polymers: 1. Synthesis and characterization of sulfobetaines and the corresponding cationic monomers by nuclear magnetic resonance spectra", Wen-Fu Lee and Chan-Chang Tsai, Polymer, 35 (10), 2210-2217 (1994), sulfopropyldimethylammoniopropylmethacrylamide, sold by Raschig under the name SPP:

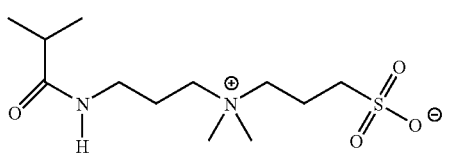

sulfopropyldimethylammonioethyl methacrylate, sold by Raschig under the name SPDA:

the synthesis of which is described in the paper "Poly(sulfopropylbetaines): 1. Synthesis and characterization", V. M. Monroy Soto and J. C. Galin, Polymer, 1984, Vol. 25, 121-128, sulfohydroxypropyldiethylammonioethyl methacrylate:

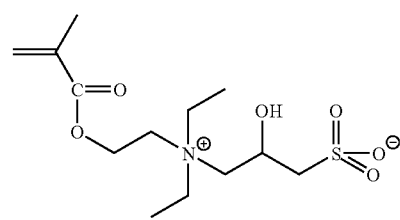 [SMILES: C=C(C)C(=O)OCC[N+](CC)(CC)CC(O)CS(=O)(=O)[O-]]

heterocyclic betaine monomers, such as:

sulfobetaines derived from piperazine:

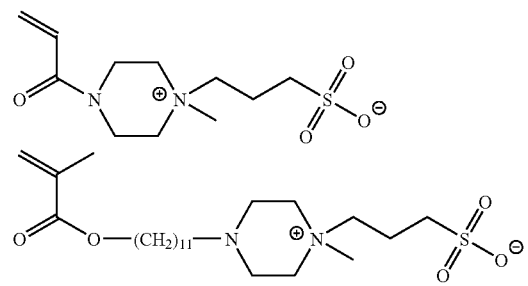

-continued

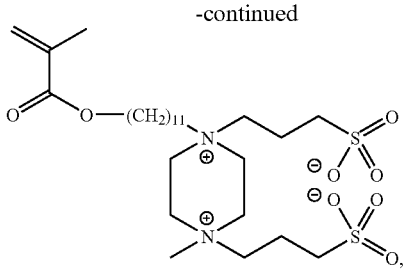

the synthesis of which is described in the paper "Hydrophobically Modified Zwitterionic Polymers: Synthesis, Bulk Properties, and Miscibility with Inorganic Salts", P. Koberle and A. Laschewsky, Macromolecules, 27, 2165-2173 (1994), sulfobetaines derived from 2-vinylpyridine and 4-vinylpyridine, such as
2-vinyl-1-(3-sulfopropyl)pyridinium betaine (2SPV or "SPV"), sold by Raschig under the name SPV:

(SPV)

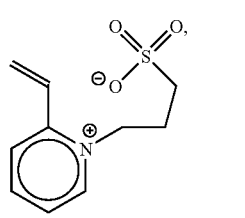

4-vinyl-1-(3-sulfopropyl)pyridinium betaine (4SPV), the synthesis of which is described in the paper "Evidence of ionic aggregates in some ampholytic polymers by transmission electron microscopy", V. M. Castaño, A. E. González, J. Cardoso, O. Manero and V. M. Monroy, J. Mater. Res., 5 (3), 654-657 (1990):

(4SPV)

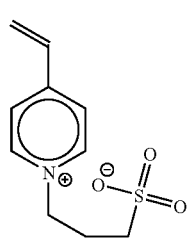

1-vinyl-3-(3-sulfopropyl)imidazolium betaine:

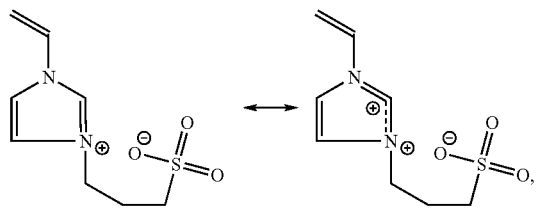

the synthesis of which is described in the paper "Aqueous solution properties of a poly(vinyl imidazolium sulfobetaine)", J. C. Salamone, W. Volkson, A. P. Oison and S. C. Israel, Polymer, 19, 1157-1162 (1978), alkylsulfonates or -phosphonates of dialkylammonioalkylallylics, such as sulfopropylmethyldiallylammonium betaine:

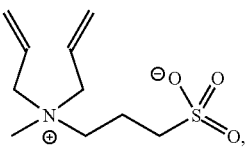

the synthesis of which is described in the paper "New poly(carbobetaine)s made from zwitterionic diallylammonium monomers", Favresse, Philippe and Laschewsky, Andre, Macromolecular Chemistry and Physics, 200(4), 887-895 (1999), alkylsulfonates or -phosphonates of dialkylammonioalkylstyrenes, such as:

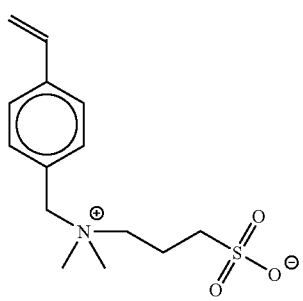

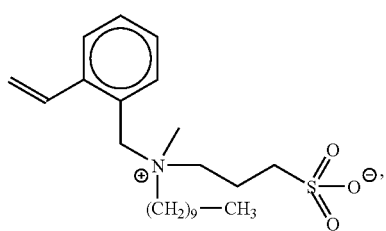

the synthesis of which is described in the paper "Hydrophobically Modified Zwitterionic Polymers: Synthesis, Bulk Properties, and Miscibility with Inorganic Salts", P. Koberle and A. Laschewsky, Macromolecules, 27, 2165-2173 (1994), betaines resulting from ethylenically unsaturated anhydrides and dienes, such as:

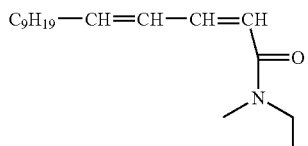

and

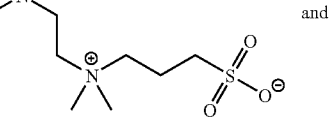

-continued

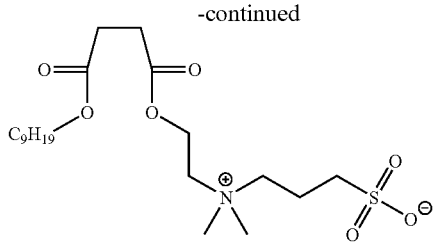

the synthesis of which is described in the paper "Hydrophobically Modified Zwitterionic Polymers: Synthesis, Bulk Properties, and Miscibility with Inorganic Salts", P. Koberle and A. Laschewsky, Macromolecules, 27, 2165-2173 (1994), phosphobetaines, such as:

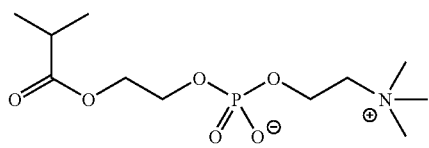 (MPC)

or alternatively:

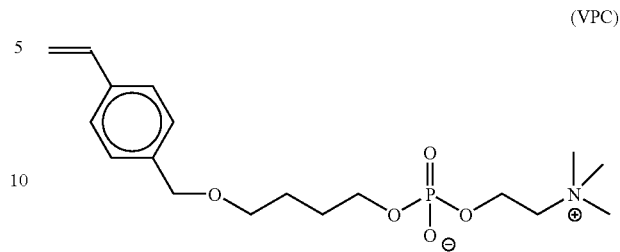

(VPC)

The synthesis of MPC and of VPC is described in EP 810 239 B1 (Biocompatibles, Alister et al.).

The polymer according to the invention can also be obtained in a known way by chemical modification of a polymer, referred to as precursor polymer, comprising units $A_{Z\,precursor}$ which will be modified (betainized) by postpolymerization reaction to give units $A_Z$ exhibiting a betaine group. Thus, sulfobetaine units can be obtained by chemical modification of units of a precursor polymer, preferably by chemical modification of a polymer comprising pendant amine functional groups, using a sulfonated electrophilic compound, preferably a sultone (propanesultone or butanesultone) or a haloalkylsulfonate.

A few synthetic examples are given below:

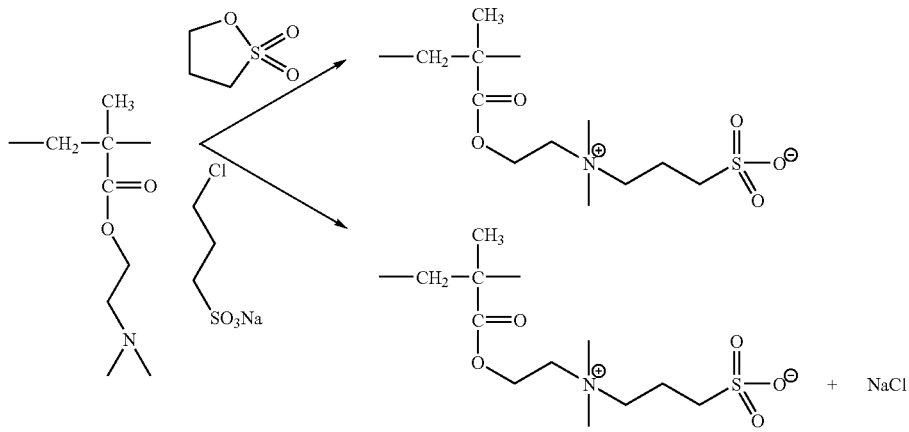

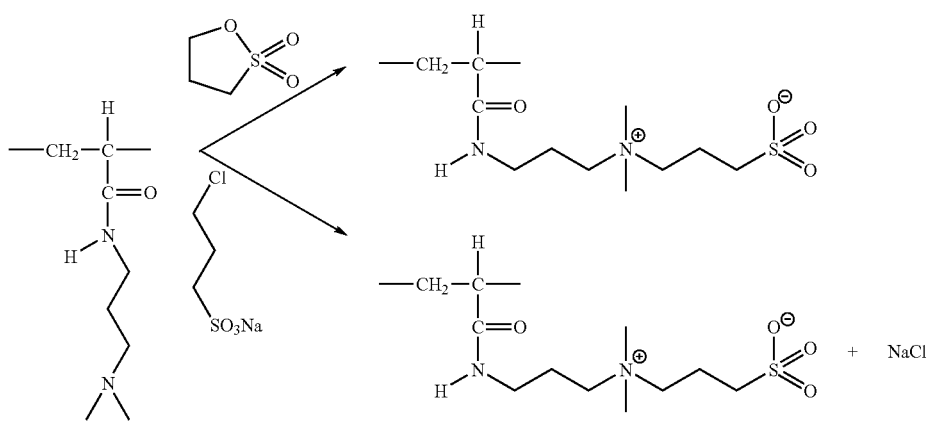

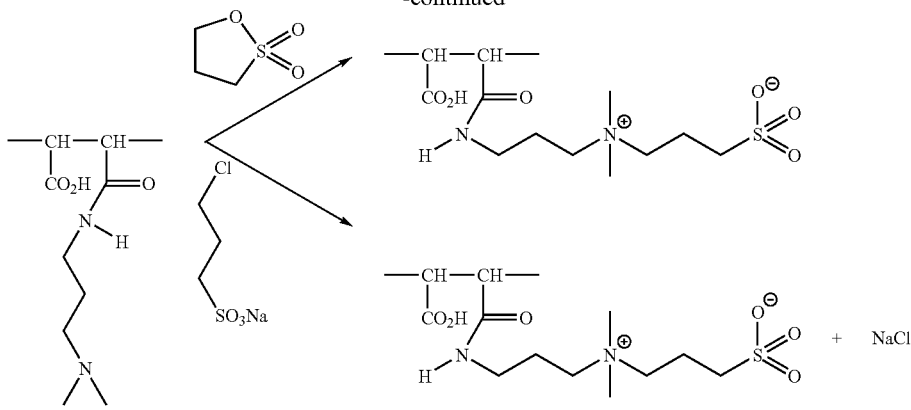

The main routes of access by chemical modification of a precursor polymer by sultones and haloalkylsulfonates are described in particular in the following documents:

"Synthesis and aqueous solution behavior of copolymers containing sulfobetaine moieties in side chains", I. V. Berlinova, I. V. Dimitrov, R. G. Kalinova, N. G. Vladimirov, Polymer, 41, 831-837 (2000)

"Poly(sulfobetaine)s and corresponding cationic polymers: 3. Synthesis and dilute aqueous solution properties of poly(sulfobetaine)s derived from styrene-maleic anhydride", Wen-Fu Lee and Chun-Hsiung Lee, Polymer, 38 (4), 971-979 (1997)

"Poly(sulfobetaine)s and corresponding cationic polymers. VIII. Synthesis and aqueous solution properties of a cationic poly(methyl iodide quaternized styrene-N,N-dimethylaminopropyl maleamidic acid) copolymer", Lee, Wen-Fu and Chen, Yan-Ming, Journal of Applied Polymer Science, 80, 1619-1626 (2001)

"Synthesis of polybetaines with narrow molecular mass distribution and controlled architecture", Andrew B. Lowe, Norman C. Billingham and Steven P. Armes, Chem. Commun., 1555-1556 (1996)

"Synthesis and Properties of Low-Polydispersity Poly(sulfopropylbetaine)s and Their Block Copolymers", Andrew B. Lowe, Norman C. Billingham and Steven P. Armes, Macromolecules, 32, 2141-2146 (1999)

Japanese patent application published on 21 Dec. 1999 under the number 11-349826.

The preparation of polyphosphonato- and phosphinatobetaines by chemical modification is reported in "New polymeric phosphonato-, phosphinato- and carboxybetaines", T. Hamaide, Macromolecular Chemistry, 187, 1097-1107 (1986).

According to a preferred embodiment, the units $A_Z$ exhibit one of the following formulae:

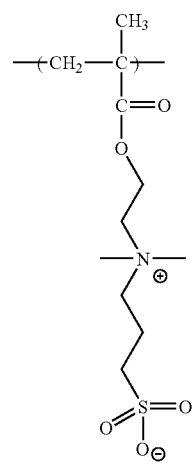

-(SPE)-

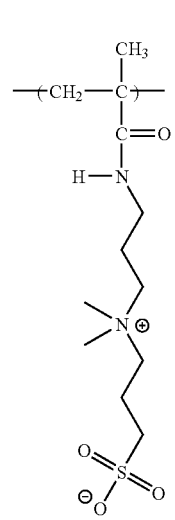

-(SPP)-

-continued
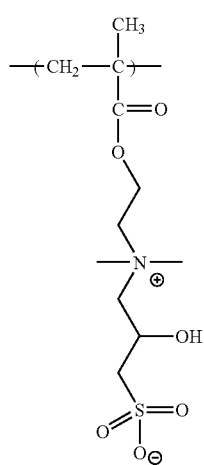 -(SHPE)-
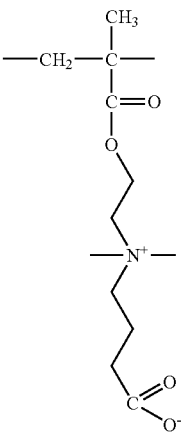 -(CPE)-
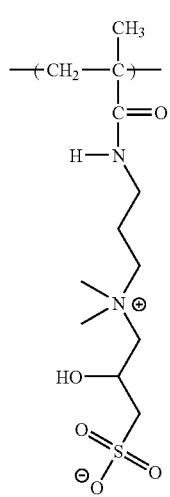 -(SHPP)-
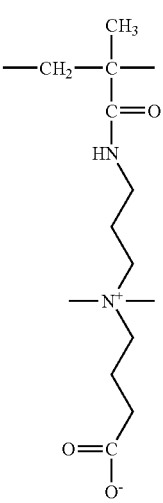 -(CPP)-
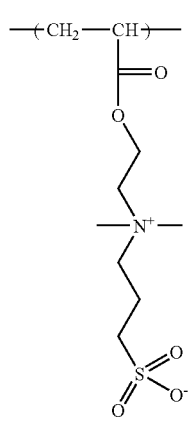 -(SPDA)-
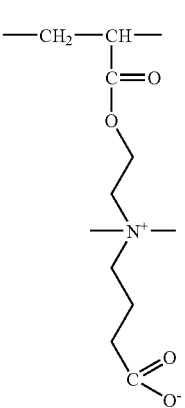 -(CPDA)-
Mention is in particular made, as units $A_Z$, of the units of carboxybetaine type (comprising a carboxybetaine group) of the following formulae:

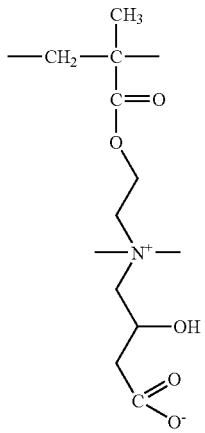
-(CHPE)-

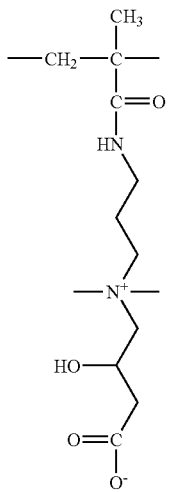
-(CHPP)-

Units $A_{other}$

The macromolecular chain A can additionally comprise hydrophilic units $A_{other}$. These units are different from the units $A_Z$; they do not comprise betaine groups. The units $A_{other}$ derive from monomers $A_{other}$. The units $A_{other}$ can in particular comprise:
- neutral units $A_N$ deriving from neutral monomers $A_N$,
- cationic or potentially cationic units $A_C$ deriving from cationic or potentially cationic monomers $A_C$,
- anionic or potentially anionic units $A_A$ deriving from anionic or potentially anionic monomers $A_A$,
- mixtures or combinations of such units.

According to specific embodiments, the copolymer is substantially devoid (it comprises less than 1 mol %, preferably less than 0.5 mol %, thereof and preferably does not comprise any at all thereof) of the following units:
- units $A_C$, and/or
- units $A_N$ chosen from:
  - alkoxylated units of following formula:

—CH$_2$—CHR$^6$[—X$^2$—(CH$_2$—CH$_2$—O)$_n$—R$^7$]— in which:
  - R$^6$ is a hydrogen atom or a methyl group,
  - X$^2$ is a group of formula —CO—O—, —CO—NH— or —C$_6$H$_4$—CH$_2$—
  - n is a whole or mean number of greater than or equal to 1,
  - R$^7$ is a hydrogen atom, an alkyl group or a tristyrylphenyl group, and/or hydroxylated units of following formula:

—CH$_2$—CHR$^6$[—X$^2$—R$^8$]— in which:
- R$^6$ is a hydrogen atom or a methyl group,
- X$^2$ is a group of formula —CO—O—, —CO—NH— or —C$_6$H$_4$—CH$_2$—
- R$^8$ is a hydrocarbon group having at least two carbon atoms which comprises at least two —OH groups, preferably on two consecutive carbon atoms, and/or
- hydroxyalkyl acrylate or methacrylate units.

If the copolymer comprises hydrophilic units $A_{other}$, they will preferably be neutral units $A_N$, without anionic or potentially anionic units $A_A$ and/or without cationic or potentially cationic units $A_C$.

Units $A_N$

The units $A_N$ are hydrophilic neutral units. Mention may be made, as examples of hydrophilic neutral monomers $A_N$ from which the units $A_N$ can derive, of:
- hydroxyalkyl esters of α,β-ethylenically unsaturated acids, such as hydroxyethyl acrylate, hydroxyethyl methacrylate, hydroxypropyl acrylate, hydroxypropyl methacrylate, glycerol monomethacrylate, and the like,
- α,β-ethylenically unsaturated amides, such as acrylamide (AM), methacrylamide, N-methylolacrylamide, dimethylacrylamide, dimethylmethacrylamide, and the like,
- α,β-ethylenically unsaturated monomers carrying a water-soluble polyoxyalkylene segment of the polyethylene oxide type, such as, if appropriate random or block, polyethylene oxide and/or polypropylene oxide α-methacrylates (Bisomer S20W, S10W, and the like, from Laporte) or α,ω-dimethacrylates, and the like,
- α,β-ethylenically unsaturated monomers which are precursors of hydrophilic units or segments, such as vinyl acetate, which, once polymerized, can be hydrolyzed to produce vinyl alcohol units or polyvinyl alcohol segments,
- vinyllactams, such as vinylpyrrolidone,
- α,β-ethylenically unsaturated monomers of ureido type and in particular the methacrylamido of 2-imidazolidinone ethyl, optionally as a mixture (Sipomer WAM II from Rhodia),
- their mixtures or combinations.

Units $A_C$

The units $A_C$ are cationic or potentially cationic units comprising 1, 2, 3 or more cationic or potentially cationic groups in the chain forming the backbone of the copolymer or, preferably, in the side position with respect to the chain forming the backbone of the copolymer.

The cationic units $A_C$ are preferably units comprising at least one quaternary ammonium group. The potentially cationic units $A_C$ can be units comprising at least one tertiary amine group.

Mention may be made, as examples of potentially cationic monomers $A_C$ from which the units $A_C$ can derive, of:
- ω-(N,N-dialkylamino)alkylamides of α,β-monoethylenically unsaturated carboxylic acids, such as N,N-dimethylaminomethylacrylamide or -methacrylamide, [2-(N,N-dimethylamino)ethyl]acrylamide or -methacrylamide, [3-(N,N-dimethylamino)propyl]acrylamide or -methacrylamide or [4-(N,N-dimethylamino)butyl]acrylamide or -methacrylamide
- α,β-monoethylenically unsaturated aminoesters, such as 2-(dimethylamino)ethyl acrylate (ADAM), 2-(dimethylamino)ethyl methacrylate (DMAM), 3-(dimethylamino)propyl methacrylate, 2-(tert-butylamino)ethyl methacrylate, 2-(dipentylamino)ethyl methacrylate or 2-(diethylamino)ethyl methacrylate vinylpyridines vinylamine vinylimidazolines precursor monomers of amine functional groups, such as N-vinylformamide, N-vinylacetamide, and the like, which generate primary amine functional groups by simple acidic or basic hydrolysis.

Mention may be made, as examples of cationic monomers $A_C$ from which the units $A_C$ can derive, of:

ammoniumacryloyl or -acryloyloxy monomers, such as:
trimethylammoniopropyl methacrylate chloride,
trimethylammonioethylacrylamide or -methacrylamide chloride or bromide,
trimethylammoniobutylacrylamide or -methacrylamide methyl sulfate,
trimethylammoniopropylmethacrylamide methyl sulfate (MES),
(3-methacrylamidopropyl)trimethylammonium chloride (MAPTAC),
(3-acrylamidopropyl)trimethylammonium chloride (APTAC),
methacryloyloxyethyltrimethylammonium chloride or methyl sulfate,
acryloyloxyethyltrimethylammonium chloride or acryloyloxyethyltrimethylammonium methyl sulfate (ADAMQUAT CI or ADAMQUAT MeS),
methyldiethylammonioethyl acrylate methyl sulfate (ADAMQUAT MeS),
benzyldimethylammonioethyl acrylate chloride or methyl sulfate (ADAMQUAT BZ 80),
1-ethyl-2-vinylpyridinium or 1-ethyl-4-vinylpyridinium bromide, chloride or methyl sulfate,
N,N-dialkyldiallylamine monomers, such as N,N-dimethyldiallylammonium chloride (DADMAC),
the chloride of dimethylaminopropylmethacrylamide, N-(3-chloro-2-hydroxypropyl)trimethylammonium (DIQUAT chloride),
the methyl sulfate of dimethylaminopropylmethacrylamide, N-(3-(methyl sulfate)-2-hydroxypropyl)trimethylammonium (DIQUAT methyl sulfate),
the monomer of formula:

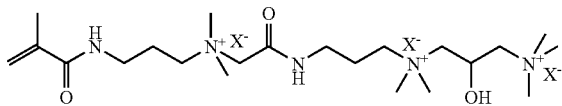

where $X^-$ is an anion, preferably chloride or methyl sulfate.

Mention may be made, as examples of potentially cationic monomers $A_C$ from which the units $A_C$ can derive, of:

ω-(N,N-dialkylamino)alkylamides of α,β-monoethylenically unsaturated carboxylic acids, such as N,N-dimethylaminomethylacrylamide or -methacrylamide, [2-(N,N-dimethylamino)ethyl]acrylamide or -methacrylamide, [3-(N,N-dimethylamino)propyl]acrylamide or -methacrylamide or [4-(N,N-dimethylamino)butyl]acrylamide or -methacrylamide α,β-monoethylenically unsaturated aminoesters, such as 2-(dimethylamino)ethyl acrylate (ADAM), 2-(dimethylamino)ethyl methacrylate (DMAM), 3-(dimethylamino)propyl methacrylate, 2-(tert-butylamino)ethyl methacrylate, 2-(dipentylamino)ethyl methacrylate or 2-(diethylamino)ethyl methacrylate vinylpyridines vinylamine vinylimidazolines precursor monomers of amine functional groups, such as N-vinylformamide, N-vinylacetamide, and the like, which generate primary amine functional groups by simple acidic or basic hydrolysis.

Units $A_A$

Mention may be made, as examples of anionic or potentially anionic monomers $A_A$ from which anionic or potentially anionic units $A_A$ can derive, of:

monomers having at least one carboxyl functional group, such as α,β-ethylenically unsaturated carboxylic acids or the corresponding anhydrides, such as acrylic acid, acrylic anhydride, methacrylic acid, methacrylic anhydride, maleic acid, maleic anhydride, fumaric acid, itaconic acid, N-methacryloylalanine, N-acryloylglycine and their water-soluble salts, monomers which are precursors of carboxylate functional groups, such as tert-butyl acrylate, which produce, after polymerization, carboxyl functional groups by hydrolysis, monomers having at least one sulfate or sulfonate functional group or a corresponding acid functional group, such as 2-sulfooxyethyl methacrylate, vinylbenzenesulfonic acid, allylsulfonic acid, 2-acrylamido-2-methylpropanesulfonic acid, sulfoethyl acrylate or methacrylate, sulfopropyl acrylate or methacrylate, and their water-soluble salts, monomers having at least one phosphonate or phosphate functional group or a corresponding acid functional group, such as vinylphosphonic acid, and the like, ethylenically unsaturated phosphate esters, such as phosphates derived from hydroxyethyl methacrylate (Empicryl 6835 from Rhodia) and those derived from polyoxyalkylene methacrylates, and their water-soluble salts.

Units B

The units B are hydrophobic and/or amphiphilic units which can form groups B. They derive from monomers B. They can thus be amphiphilic units $B_{amphi}$, hydrophobic units $B_{phobic}$ or a mixture or combination of such units. The units $B_{amphi}$ derive from amphiphilic monomers $B_{amphi}$ and the units $B_{phobic}$ derive from monomers $B_{phobic}$.

Amphiphilic monomers are known to a person skilled in the art. They exhibit a polymerizable part, a hydrophilic part and one or more hydrophobic part(s). The polymerizable part is generally an ethylenically unsaturated group. The hydrophilic part generally comprises poly(ethoxy and/or propoxy) units, preferably polyethoxy units, with a mean number of ethoxy and/or propoxy units preferably of greater than 2, preferably than 5, for example greater than 10. If propoxy and ethoxy groups are present, they can be arranged in random form or in the form of blocks. The hydrophobic part can be a hydrocarbon group comprising at least 3 carbon atoms, for example an alkyl, arylalkyl, alkaryl, arylalkylaryl or (polyarylalkyl)aryl or terpenyl group. The monomer can in particular exhibit connecting groups between the various parts, in particular an —O— or —COO— or —CONH— group or at least one urethane group (including groups derived from isocyanates, in particular groups generated from aromatic isocyanates, such as TDI). Useful amphiphilic monomers are the monomers often denoted as surfactant monomers.

Mention may be made, as examples of amphiphilic monomers $B_{amphi}$, from which units $B_{amphi}$ can derive, of:

acrylates or methacrylates of poly(ethoxylated and/or propoxylated) $C_3$-$C_{30}$ aliphatic alcohols, the aliphatic part of which is, if appropriate, substituted by one or more hydroxyl(s), preferably at the end of the aliphatic group, for example Sipomer BEM from Rhodia (ω-behenyl polyoxyethylene methacrylate, optionally as a mixture), Sipomer HPM100 from Rhodia or Plex 6877-O, acrylates or methacrylates of poly(ethoxylated and/or propoxylated) polystyrylphenols, for example Sipomer SEM-25 from Rhodia (ω-tristyrylphenyl polyoxyethylene methacrylate), acrylates or methacrylates of poly(ethoxylated and/or propoxylated) alkylphenols.

Mention may be made, as examples of hydrophobic monomers $B_{phobic}$ from which units $B_{phobic}$ can derive, of:

vinylaromatic monomers, such as styrene, α-methylstyrene, para-chloromethylstyrene, vinyltoluene, and the like, vinyl or vinylidene halides, such as vinyl chloride or vinylidene chloride, $C_1$-$C_{30}$, preferably $C_4$-$C_{22}$, alkyl esters of α,β-monoethylenically unsaturated acids, such as methyl acrylate, ethyl acrylate, butyl acrylate, 2-ethylhexyl acrylate, isooctyl acrylate, lauryl acrylate, isodecyl acrylate, stearyl acrylate, methyl methacylate, ethyl methacrylate, butyl methacrylate, 2-ethylhexyl methacrylate, isooctyl methacrylate, lauryl methacrylate, isodecyl methacrylate or stearyl methacrylate, vinyl or allyl esters of saturated carboxylic acids, such as vinyl acetate, allyl acetate, vinyl propionate, allyl propionate, vinyl versatate, allyl versatate, vinyl stearate, allyl stearate, and the like, α,β-monoethylenically unsaturated nitriles comprising from 3 to 12 carbon atoms, such as acrylonitrile, methacrylonitrile, and the like, α-olefins, such as ethylene, propylene, and the like, conjugated dienes, such as butadiene, isoprene or chloroprene, their mixtures or combinations.

Composition of the Copolymer

The copolymer of the invention can exhibit a molar ratio of the units of the macromolecular chain A to the units of the groups B of between 1/99 and 99.9/0.1, preferably between 1/99 and 99/1, in particular between 50/50 and 99.9/0.1 or 99/1. This molar ratio is even more preferably between 80/20 and 99.9/0.1 or 99/1. It can in particular be between 90/10 and 99/1 or between 90/10 and 95/5. The molar ratios and the proportions of each type of unit, chain or group can in particular be compared to the molar ratios and proportions of the monomers employed to prepare the units, chains or groups.

According to a specific embodiment, the macromolecular chain A comprises only units $A_Z$. According to a specific embodiment, the macromolecular chain A comprises units $A_Z$ and units $A_A$ and/or $A_C$ but does not substantially comprise units $A_N$ (that is to say, at most 1 mol %, preferably at most 0.5 mol %, preferably at most 0.1 mol % and even 0%).

According to a specific embodiment, the macromolecular chain A comprises units $A_Z$ and units $A_{other}$, for example units $A_A$ and/or $A_C$ and/or $A_N$, in particular units $A_Z$ and $A_N$, with a molar ratio of the units $A_Z$ to the total of the units $A_{other}$ of between 99/1 and 1/99, for example between 90/1 and 10/90. This ratio can in particular be between 99/1 and 90/10, or between 90/10 and 80/20, or between 80/20 and 70/30, or between 70/30 and 60/40, or between 60/50 and 50/50, or between 50/50 and 40/60, or between 40/60 and 30/70, or between 30/70 and 20/80, or between 20/80 and 10/90, or between 10/90 and 1/99.

The molar mass of the copolymer can, for example, be between 100 000 and 10 000 000 g/mol, preferably between 200 000 and 5 000 000 g/mol, for example between 500 000 and 3 000 000 or 4 000 000 g/mol. The polydispersity index can be relatively high, for example greater then 3, or even than 4 for copolymers with relatively high masses.

The average molar mass of a segment of macromolecular chain A (between two groups B) can, for example, be greater than 50 000 g/mol, preferably than 100 000 g/mol.

It is mentioned that the copolymer can be provided in any practical form, for example in the dry solid form or in the vectorized form, for example in the form of a solution or of an emulsion or of a suspension, in particular in the form of an aqueous solution. The vectorized form, for example an aqueous solution, can in particular comprise from 5 to 50% by weight of the copolymer, for example from 10 to 30% by weight. The aqueous solution can in particular be a solution obtained by an aqueous-phase preparation process, in particular a controlled micellar polymerization process. It can comprise some of the compounds used in the preparation process, in particular a surfactant, generally in a modest amount.

Preparation Process

The invention relates in particular to a process for the preparation of a copolymer comprising:

units $A_Z$ comprising a betaine group, the betaine group comprising a cationic group and an anionic group, and optionally other hydrophilic units $A_{other}$, and at least one group B of hydrophobic and/or amphiphilic units B.

The process is in particular appropriate for the preparation of the copolymers as described above. The process can constitute an alternative description of the copolymers; there is thus no complete commitment to the description of the copolymers described above, in particular as regards their architecture (ways in which the various units are distributed or arranged). Everything which has been indicated above as regards the natures, the amounts and the ratios of the units which can be present in the copolymer or as regards the natures, the amounts and the ratios of the monomers from which they can derive can be applied to the process of the invention and will not always be repeated below. It should be noted that, if monomers $A_{Z\,precursor}$ are used, the molar ratios and amounts given for the units $A_Z$ can be applied during the process. That which has been indicated as regards the arrangement of the units in the copolymer of the invention can optionally be applied to the process of the invention and will not always be repeated below. That which has been indicated as regards the molecular weights of the or in the copolymer of the invention can optionally be applied to the process of the invention and will not always be repeated below.

Thus, the process of the invention is a process comprising the following stages:

a) an aqueous fluid B is prepared the aqueous fluid B comprising:

at least one ethylenically unsaturated monomer B which is hydrophobic ($B_{phobic}$) and/or amphiphilic ($B_{amphi}$), and optionally a surfactant, with the condition that, if the monomer B is a hydrophobic monomer $B_{phobic}$, then the aqueous fluid B comprises a surfactant, the monomer B being included in micelles of surfactant and/or of amphiphilic monomer $B_{amphi}$, with at least one of the following conditions:

the number $n_H$ of monomers in the micelles is greater than 2.6, preferably greater than or equal to 3, preferably greater than or equal to 5, preferably greater than or equal to 10, and/or the ratio in moles of the surfactant to the monomer B is less than or equal to 28, preferably less than or equal to 20, preferably less than or equal to 15, preferably less than or equal to 10, preferably less than or equal to 7, and/or the ratio by weight of the surfactant, if it is present, to the monomer B is less than or equal to 30, preferably less than or equal to 20, preferably less than or equal to 15, preferably less than or equal to 10, preferably less than or equal to 7, b) polymerization is carried out by bringing together, in an aqueous medium:
the micelles of the aqueous fluid B,
monomers $A_Z$ or $A_{Z\ precursor}$ and optionally other hydrophilic monomers $A_{other}$, these monomers being in solution in the aqueous medium, the monomers $A_Z$ being monomers comprising a betaine group, the monomers $A_{Z precursor}$ being monomers comprising a group capable of being used to form betaine groups $A_Z$ by a reaction subsequent to the polymerization, and
a source of free radicals, and c) optionally, if monomers $A_{Z\ precursor}$ have been employed during stage b), the units deriving from these monomers are reacted so as to form betaine groups $A_Z$.

Such a process is a process of controlled micellar polymerization type. The presence of micelles can be determined in a way known to a person skilled in the art.

It should be noted that, in the process, if amphiphilic monomers B ($B_{amphi}$) are employed in the absence of surfactant, then these monomers can be regarded as both monomers and surfactants, the surfactant/monomer ratios then being regarded as being equal to 1 (if the monomer $B_{amphi}$ is used in the absence of surfactant) or less than 1 (if the monomer $B_{amphi}$ is used in the presence of surfactant).

Controlled micellar polymerization processes are known to a person skilled in the art. In particular, the polymerization of stage b) can be carried out in any way known to a person skilled in the art. In particular, the source of free radicals, the amount of free radicals, the steps for introducing the various compounds and fluids, the polymerization temperature and other operating parameters or conditions can be varied in a known and appropriate way. A few details or instructions are given below.

According to a specific embodiment, the process comprises a polymerization of precursors of the units $A_Z$ and then a stage c) of postpolymerization modification. Such processes are known to a person skilled in the art. Some were mentioned above, in the part relating to the units $A_Z$.

It is believed that, during the controlled micellar polymerization process, a radical polymerization of the water-soluble monomers (monomers A) takes place in the aqueous phase, forming macromolecular chains which comprise units deriving from the water-soluble monomers A and which carry free radicals propagating at the chain end. It is believed that these free radicals encounter, randomly and/or statistically, the micelles and then the polymerization reaction continues with the monomers of the micelle and then continues subsequently with the water-soluble monomers of the aqueous phase. It is believed that, when the polymerization reaches the micelle, it randomly polymerizes all or a portion of the monomers of the micelle before repropagating in the aqueous phase, thus forming, in macromolecular chains A of the water-soluble monomers, groups of units deriving from the monomers included in the micelles (monomers B). It is thus believed that the number of units in the groups is substantially equal (or within a margin of ±25% by number, or even of ±10% by number), on average, to the number of monomers included in the micelle.

Thus, it is believed that, if a large number of monomers is included in the micelle, then the groups will comprise a large number of units. It is believed and has been found, in particular, surprisingly, that this has a significant influence on the properties of the copolymers. The size of the micelles of a surfactant and thus the ability of the micelles to comprise more or less large amounts of hydrophobic monomers is related in particular to the amount of the surfactant. It is believed and has been found, in particular, surprisingly, that the lower the surfactant/monomer B ratio, the greater the amount of monomer B included in the micelles, and/or the greater the number of units B in groups B, and/or the more advantageous the effects as regards the rheological properties exhibited by the copolymer. This can in particular be reflected in terms of process and/or of structure by the number $n_H$ defined above. It has in particular been found that the use of amphiphilic monomers B and/or the presence of amphiphilic units B provides advantageous effects as regards rheological properties. It is mentioned that, if amphiphilic monomers B are employed, these may make a contribution to the formation of a micelle. If they are not combined with surfactant, they can self-form micelles. If they are combined with a surfactant, they can participate in the micellization (comicellization with the surfactant) and/or simply enter the micelle. In the case where amphiphilic monomers B ($B_{amphi}$) are employed, a number $n_H$ can be determined by the techniques of the literature by evaluating the aggregation number and the critical micelle concentration of the combination of the surfactant and of monomer $B_{amphi}$. Preferably, in the embodiment where amphiphilic monomers B are employed and/or in the case where units $B_{amphi}$ are present in the copolymer, the conditions relating to the number $n_H$ with these monomers or units, alone or in combination with a surfactant, are adhered to (the amphiphilic monomer being ranked as surfactant and also as monomer).

The process of the invention can be a process of batch type, of semibatch type or even of continuous type. A process of semibatch type typically comprises a step of gradual introduction of at least one monomer (comonomer), preferably of all the monomers (comonomers) into a reactor, without continuous departure of the reaction product, the reaction product, comprising the polymer, being recovered all at once at the end of the reaction.

Stage b) can be carried out batchwise, semibatchwise or even continuously. Stage a) can be carried out batchwise, semibatchwise or even continuously. If stage b) is of semibatch and/or continuous type, then stage a) can be carried out batchwise (with storage), semibatchwise (if appropriate with storage steps before introduction into the polymerization medium) or continuously (preparation followed directly by introduction into the polymerization medium).

The operation can in particular be carried out in one of the following ways:
stage a) batch, and
stage b) batch, or
stage a) continuous or semibatch, and
stage b) semibatch, or
stage a) batch, and
stage b) semibatch.

The processes where stage b) is carried out semibatchwise, in particular with a batch stage a), prove to be particularly effective and appropriate. They make it possible in particular to improve the uniformity of the composition of the copolymer and/or to prevent drifts in composition, in particular at the end of the reaction.

For example, stage b) can comprise the following stages:

b1) an aqueous solution A comprising the monomers $A_Z$ or $A_{Z\,precursor}$ and optionally a salt is prepared, b2) at least a portion of the aqueous solution A, at least a portion of the aqueous fluid B and at least a portion of the source of free radicals are brought together, in order to form a reaction mixture, b3) polymerization is carried out by generating free radicals in the reaction mixture, preferably by heating, b4) if appropriate, the remaining portions of the aqueous solution A and/or of the aqueous fluid B and/or of the source of free radicals are added to the reaction mixture, it being possible for each to be added all at once or continuously. In the present patent application, the term "continuous" covers gradual introductions (regular isolated introductions over a given time) or progressive introductions (progressive introduction without halting over a given time).

It should be noted that some of the stages among stage a) or stages b1), b2) or b3) can be carried out simultaneously. Thus, the polymerization of stage b3) is continued during stage b4), if there is one. It is indicated that stages a) and b1) can be carried out simultaneously in a separate manner.

Stages b2), b3) and b4) can be carried out in a device known as a reactor.

During stage b2), it is possible in particular to introduce all of the aqueous solution A and/or all of the aqueous fluid B and/or all of the source of free radicals. It is preferable not to introduce all of the aqueous fluid B and to introduce the latter continuously. It is preferable not to introduce all of the aqueous solution A and to introduce the latter continuously.

During stage b2), a source of free radicals is brought together with at least a portion of the monomers of the aqueous solution A and at least a portion of the aqueous fluid B. The source of free radicals (all or a portion) may have been introduced beforehand into the aqueous solution A and/or into the aqueous fluid B. Alternatively, the source of free radicals (all or a portion) may have been introduced into the reactor where the aqueous solution A and the aqueous fluid B are brought together, independently of the aqueous solution A (all or a portion) and of the aqueous fluid B (all or a portion), for example during the formation of a vessel heel.

It should be noted that the aqueous solution A and the aqueous fluid B can be premixed before being brought together with the source of free radicals. It is possible in particular to prepare the aqueous fluid B and the aqueous solution A separately and then to mix them. However, it is not out of the question to add the monomers A to the aqueous fluid B or to mix all the ingredients of the premix together (in this case, the aqueous fluid B and the aqueous solution A merge). According to one embodiment, it is possible, during stage b2), to bring together a portion of the premix with the source of free radicals (all or a portion) and to introduce the remainder of the premix during a stage b4).

A few sequences which can be used are described in detail below.

According to a sequence of batch type, the operation can be carried out in the following way:

i) the aqueous fluid B is prepared (stage a)
ii) the aqueous solution A is prepared (stage b1)
iii) the aqueous fluid B and the aqueous solution A are mixed and the whole of the mixture is introduced into the reactor (the mixing can be carried out in the reactor)
iv) the source of free radicals, preferably a partially soluble initiator, is added (stage b2)
v) polymerization is carried by out heating (stage b3).

It should be noted that it is possible to begin to heat before the addition of the source of free radicals.

According to another sequence of batch type, the operation can be carried out in the following way:

i) a vessel heel comprising the source of free radicals is prepared in the reactor, preferably with water,
ii) the aqueous fluid B is prepared (stage a)
iii) the aqueous solution A is prepared (stage b1)
iv) the aqueous fluid B and the aqueous solution A are mixed and the whole of the mixture is introduced into the reactor (the mixing can be carried out in the reactor) (stage b2)
iv) polymerization is carried out by heating.

According to a sequence of semibatch type, the operation can be carried out in the following way:

i) the aqueous fluid B is prepared (stage a)
ii) the aqueous solution A is prepared (stage b1)
iii) the aqueous fluid B and the aqueous solution A are mixed in order to obtain a premix (it is alternatively possible to prepare the premix directly, omitting stage i) and/or stage ii))
iv) a vessel heel comprising a portion of the premix and the source of free radicals is prepared in the reactor, preferably with water
v) the polymerization is initiated by heating
vi) the remainder of the premix is continuously added, while heating, so as to continue the polymerization, the source of free radicals being introduced into the premix (stage iii) or separately, in all or in part, into the vessel heel (stage iv), the remainder being optionally introduced during stage vi).

It should be noted that, alternatively to the premix, it is possible to introduce the aqueous solution A and the aqueous fluid B separately (it being possible for the source of free radicals in particular to be then introduced into the aqueous fluid B and/or into the aqueous solution A, if the latter is introduced into the premix).

According to another sequence of semibatch type, the operation can be carried out in the following way:

i) the aqueous fluid B is prepared (stage a)
ii) the aqueous solution A is prepared (stage b1)
iii) the aqueous fluid B and the aqueous solution A are mixed in order to obtain a premix (it is alternatively possible to prepare the premix directly, omitting stage i) and/or stage ii))
iv) a vessel heel comprising water and optionally surfactant is prepared in the reactor (the surfactant can contribute to preserving the micelles of the aqueous fluid B during the first addition to the reactor)
v) the premix is added continuously, while heating, so as to be polymerized, the source of free radicals being introduced into the premix or separately, in all or in part, into the vessel heel (stage iv), the remainder being optionally introduced during stage v).

It should be noted that it is possible to begin to heat before the introduction of the premix.

It should be noted that, alternatively to the premix, it is possible to introduce the aqueous solution A and the aqueous fluid B separately (it being possible for the source of free radicals in particular to be then introduced into the aqueous fluid B and/or into the aqueous solution A, if the latter is introduced into the premix).

Surfactants

Any surfactant capable of forming micelles in water can be used. Employing the surfactant is of particular use in the formation of micelles if the monomers B are solely hydrophobic monomers $B_{phobic}$. The surfactant is generally used, in particular for the polymerization in the absence of monomers $B_{amphi}$, at a concentration greater than the critical micelle concentration. Use may in particular be made of at least one anionic, nonionic, amphoteric (including zwitterionic) or cationic surfactant or a mixture or a combination of these. Use may preferably be made of anionic or nonionic surfactants.

Use may in particular be made of the conventional anionic surfactants chosen in particular from alkyl sulfates, such as sodium lauryl sulfate, alkylsulfonates, alkylaryl sulfates, alkylarylsulfonates, such as sodium dodecylbenzenesulfonate, aryl sulfates, arylsulfonates, ethoxylated alkyls, ethoxylated alkylaryls, sulfated or phosphated ethoxylated alkyls or ethoxylated alkylaryls or their salts, sulfosuccinates, alkali metal alkyl phosphates, salts of hydrogenated or non-hydrogenated abietic acid, or fatty acid salts, such as sodium stearate.

Use may in particular be made of the conventional anionic surfactants chosen in particular from ethoxylated and/or propoxylated alcohols, ethoxylated and/or propoxylated fatty acids, block copolymers of polyethylene oxide and of polypropylene oxide, and the like.

It should be noted that the reaction medium can in particular comprise an organic or inorganic salt. The latter can, for example, be introduced into the aqueous solution A. The salt can facilitate the maintenance in solution of the copolymer obtained, in particular if it exhibits a high molar mass, or improve the maintenance in and/or the introduction into the micelles of the monomers B (in particular $B_{phobic}$). Mention is in particular made, as salts which can be used, of salts having an alkali metal, an alkaline earth metal or an ammonium (for example $NH_4^+$) cation and having a halogen, a phosphate, a sulfate or a nitrogen oxide anion. Mention is made, for example, of sodium chloride or sodium sulfate or ammonium sulfate.

Polymerization

Any source of free radicals can be used. It is possible in particular to generate free radicals spontaneously, for example by increasing the temperature, with appropriate monomers, such as styrene (monomer B). It is possible to generate free radicals by irradiation, in particular by UV irradiation, preferably in the presence of appropriate UV-sensitive initiators. It is possible to use initiators or initiator systems of radical or redox type. The source of free radicals may or may not be water-soluble. It may be preferable to use water-soluble initiators or at least partially water-soluble initiators (for example, soluble in water to at least 50% by weight).

Generally, the higher the amount of free radicals, the more easily the polymerization is initiated (it is promoted) but the smaller the molecular weights of the copolymers obtained.

Use may in particular be made of the following initiators:
hydrogen peroxides, such as: tert-butyl hydroperoxide, cumene hydroperoxide, t-butyl peroxyacetate, t-butyl peroxybenzoate, t-butyl peroxyoctoate, t-butyl peroxyneodecanoate, t-butyl peroxyisobutyrate, lauroyl peroxide, t-amyl peroxypivalate, t-butyl peroxypivalate, dicumyl peroxide, benzoyl peroxide, potassium persulfate or ammonium persulfate,
azo compounds, such as: 2,2'-azobisisobutyronitrile, 2,2'-azobis(2-butanenitrile), 4,4'-azobis(4-pentanoic acid), 1,1'-azobis(cyclohexanecarbonitrile), 2-(t-butylazo)-2-cyanopropane, 2,2'-azobis{2-methyl-N-[1,1-bis(hydroxymethyl)-2-hydroxyethyl]propionamide}, 2,2'-azobis[2-methyl-N-(hydroxyethyl)propionamide], 2,2'-azobis(N,N'-dimethyleneisobutyramidine) dichloride, 2,2'-azobis(2-amidinopropane) dichloride, 2,2'-azobis(N,N'-dimethyleneisobutyramide), 2,2'-azobis{2-methyl-N-[1,1-bis(hydroxymethyl)-2-hydroxyethyl]propionamide}, 2,2'-azobis{2-methyl-N-[1,1-bis(hydroxymethyl)ethyl]propionamide}, 2,2'-azobis[2-methyl-N-(2-hydroxyethyl)propionamide] or 2,2'-azobis(isobutyramide) dihydrate,
redox systems comprising combinations, such as:
mixtures of hydrogen peroxide, alkyl peroxide, peresters, percarbonates and the like and of any iron salt, titanous salt, zinc formaldehydesulfoxylate or sodium formaldehydesulfoxylate, and reducing sugars,
alkali metal or ammonium persulfates, perborates or perchlorates, in combination with an alkali metal bisulfite, such as sodium metabisulfite, and reducing sugars, and
alkali metal persulfates in combination with an arylphosphinic acid, such as benzenephosphonic acid and others of a like nature, and reducing sugars.

The polymerization temperature can in particular be between 25° C. and 95° C. The temperature can depend on the source of free radicals. If it is not a source of UV initiator type, it will be preferable to operate between 50° C. and 95° C., more preferably between 60° C. and 80° C. Generally, the higher the temperature, the more easily the polymerization is initiated (it is promoted), but the lower the molecular weights of the copolymers obtained.

Uses—Compositions

The copolymer of the invention can advantageously be used in an aqueous composition. The invention also relates to the compositions, preferably aqueous compositions, comprising the copolymer. In the aqueous compositions, it can be used as rheology-modifying agent, for example as thickening agent. The copolymer thus makes it possible in particular to increase the viscosity of the compositions.

The aqueous composition can additionally comprise ionic entities, such as inorganic salts or organic salts, in particular salts of acids, it being possible for said salts to exhibit a surfactant or non-surfactant nature. The aqueous composition can in particular be a "saline" composition. The copolymer makes it possible in particular to increase the viscosity of compositions comprising ions, in particular of saline compositions, in particular of compositions with a relatively high ionic strength, in particular of compositions comprising relatively large amounts of salts, in particular of compositions based on seawater or on brines.

The ionic strength of the composition can be from low to high, depending on the application. It has been found that the copolymer can be effective as thickening agent at a zero or low ionic strength and that it can surprisingly remain effective at a high ionic strength. The ionic strength can, for example, be at least 0.7 mol/l, indeed even at least 1 or even 2 mol/l. The composition can in particular comprise at least 35 g/l of a salt.

The composition can in particular comprise at least one surfactant, for example a surfactant employed during the preparation of the copolymer. The amount of surfactant can be the amount introduced with the copolymer, if a surfactant was used during the preparation of the latter. However, it is not out of the question to add some of it. Preferably, the composition comprises at least 0.001% by weight, advantageously at least 0.01% or 0.1% by weight, of surfactant, with respect to the copolymer.

The total amount of surfactant included in the composition can in particular vary according to the use of the composition. The total amount can range from the values indicated above to approximately 20%, for example typically from 5% to 15% or 20%, for detergent compositions, in particular compositions for caring for the body intended to be rinsed out, such as shampoos and/or shower gels.

The salts included in the composition can in particular be metal salts, in particular salts of alkali metals or alkaline earth metals, which are monovalent, divalent or polyvalent, according to the valences available for said metals. They can, for example, be NaCl, and/or NaBr, and/or $CaCl_2$, and/or $CaBr_2$, and/or $ZnBr_2$, and/or, generally, more or less complex brines. The composition can in particular be a seawater or brine composition comprising the copolymer.

The amount by weight of copolymer in the compositions can depend on the rheological behavior desired and/or on the thickening strength desired for the compositions, and on the optional presence of other compounds, in particular ionic compounds, such as salts. In practice, the amount by weight can in particular be greater than 0.01% by weight, with respect to the composition, for example greater than 0.1% by weight and often greater than or equal to 0.5% or 1%. The amount will generally be less than or equal to 20% by weight, preferably 10%. Advantageous thickenings can in particular be observed within ranges from 0.5% to 1% by weight, and/or from 1% to 2%, and/or from 2% to 3%, and/or from 3% to 4%, and/or from 4% to 5%.

The composition can in particular be:
a fluid used for the extraction of oil and/or gas,
a fluid used in civil engineering, in particular for excavation and/or digging operations,
a household care composition, in particular a consumer product intended to be used in the private sphere, or a product having an industrial and/or institutional purpose generally intended to be used by cleaning services, for example a composition for cleaning textiles (detergent for washing machine or for cleaning by hand) or a composition for cleaning dishes in a dishwasher or by hand,
a cosmetic composition, preferably intended to be rinsed out, such as a shampoo, a conditioner intended to be rinsed out, and/or a shower gel.

In the compositions for household care or in cosmetic compositions in particular, the copolymer can provide a viscosity and/or flow properties and/or a texture which are valued by consumers. In cosmetic compositions comprising structured surfactant phases, the copolymer can provide an advantageous excess viscosity.

Finally, it is mentioned that the fluid can be used as fluid for the removal of excavation products, in particular in the sectors of deep level construction, of the execution of tunnels or wells, in civil engineering, in the exploitation of oil and/or gas fields or in the mining sector. The excavation products in these applications are suspended in the fluid by introduction of the fluid into the area from where they have to be removed. The document U.S. Pat. No. 5,439,317 gives examples of applications of excavations.

The compositions, whatever the field of use, can comprise dispersed liquid particles (emulsified droplets) or dispersed solid particles. Liquid particles can, for example, be synthetic oils (for example silicone oils) or oils of vegetable or mineral origin. The solid particles can in particular be sand, density-modifying particles, debris and/or polymeric particles. The copolymer can promote the suspending of these particles during the time necessary for the use of the composition and/or during a storage time. It can also or alternatively contribute to easy transportation of the particles, in order to position them at or to move them to an appropriate spot.

It is mentioned that the composition can have a temperature ranging from 20° C. to relatively high temperatures, for example greater than or equal to 50° C., in particular greater than or equal to 70° C., in particular greater than or equal to 100° C., in particular greater than or equal to 150° C. or even greater than or equal to 180° C. The pressure can be atmospheric pressure or a greater pressure. The temperature and the pressure can vary according to the use which is made of the fluid and its environment. The copolymer can remain effective under conditions requiring relatively high temperatures, in particular in the fields of oil and/or gas extraction. Thus, the composition can be employed at the temperatures mentioned above.

The fluid used for the extraction of oil and/or gas can in particular be:
a drilling fluid,
a completion fluid,
a fracturing fluid,
a gravel packing fluid,
a production fluid,
an enhanced oil recovery fluid.

Such fluids, and the associated operations, are known to a person skilled in the art. It should be noted that the copolymer can be introduced into the fluid by mixing with a composition outside the formation or that it can be introduced beforehand into the formation and then be brought together with a composition in the formation and/or in the well, if appropriate gradually, in particular by techniques for compression in the formation and/or in the bottom of the well (techniques referred to as squeeze treatments). After the compression, the copolymer can be gradually released into a circulating fluid.

In the case of enhanced oil recovery fluids, the copolymer can contribute to providing the fluid with a viscosity and/or a rheology, under the conditions of temperature, of pressure and of chemical environment of the exploited formation, appropriate for forcing the oil out of the formation. It can thus improve the effectiveness of flushing, for example by preventing and/or delaying the formation of preferred flow pathways in the formation. The copolymer furthermore exhibits a chemical stability suited to this use.

In the context of fracturing fluids or gravel packing fluids, the control of the rheology of the fluids can make it possible to provide, first, for the transportation of particles (for example sand, ceramics, particles of polymers, for example based on polyamide, or gravel), thus preventing their sedimentation. In this context, a viscosity of the order of 100 cP at a shear rate of $100\ s^{-1}$ and/or a yield point can be obtained.

A few additional details with regard to the compositions (fluids) which can be employed in the context of the extraction of oil and/or gas and with regard to the associated operations are given below.

The fluids, in particular fracturing fluids, can comprise at least one gas, such as air, nitrogen or carbon dioxide. They can also comprise liquefied gases, such as liquid carbon dioxide.

The use of the copolymer of the invention can be advantageous in a fracturing fluid and more particularly advantageous at relatively high exploitation temperatures, of the order of 120° C. to 150° C. The pH is generally from 8 to 10 and often greater than 9. Significant and/or rapid deteriorations in the rheological properties, in particular in the viscosity and/or viscoelastic properties, which might render said fluid difficult to use, are not observed with a fluid comprising the copolymer. The fracturing operation can advantageously be a fracturing with carbon dioxide, in which liquid carbon dioxide is injected into the fracturing fluid. The use as fracturing fluid can advantageously be a use as fracturing fluid with carbon dioxide, the fluid comprising liquid carbon dioxide.

The use of a fracturing fluid consists in injecting the fluid into the well at a flow rate, a pressure and a shear rate sufficient to create cracks in the rocks traversed and thus to increase the permeability of the rocks comprising the oil or the gas.

Fracturing techniques are described in particular in U.S. Pat. No. 5,551,516 and in "Oilfield Applications", Encyclopedia of Polymer Science and Engineering, vol. 10, pp 328-366.

The fracturing fluid generally comprises solid particles, the role of which is to keep open the cracks created during the fracturing operation. The particles are dispersed, for example in suspension, in the fluid and transported into the cracks. They prevent the latter from reclosing when the pressure decreases in the rock, due to a decline, experienced or brought about, in viscosity of the fluid or due to an intentional operation on the flow rate, the pressure or the shear rate.

More particularly, these solid particles can be chosen from sand, quartz, siliceous quartz, sintered bauxite, glass beads, ceramic beads, aluminum particles, nutshell fragments or polymer particles, in particular particles of thermoplastic polymer, for example polyamide-based particles. The particle size of these particles is typically 20-40 mesh. Usually, the amount of solid particles in the fluid is between 0.05 kg and 0.5 kg, for example between 0.2 kg and 0.3 kg, of particles per liter of fracturing fluid.

It should be noted that the fracturing fluids can comprise thermal stabilizing agents, such as, for example, sodium thiosulfates and thiosulfites, thiourea, methanol, ethylene glycol, isopropanol, and the like.

If appropriate, the fracturing fluid can comprise an additive which limits the swelling of clays, such as, for example, potassium chloride, calcium chloride, calcium sulfate (gypsum), and the like. Generally, the content of compounds of this type, when they are present, is between 1 and 4% by weight of the fluid.

The fracturing fluid can, of course, comprise other components conventionally used in the field, such as antifoaming agents or scale inhibitors.

The use of the copolymer can be advantageous in a drilling fluid, in particular in the field of exploitation of oil or gas fields.

In addition to the copolymer, the drilling fluids can comprise thinning or dispersing agents.

Thus, polyphosphates, tannins, lignosulfonates, lignin derivatives, peats and lignites, polyacrylates or polynaphthalenesulfonates, alone or as a mixture, can participate in the composition of the drilling fluids.

The amount of thinning or dispersing agent can vary. By way of indication, this amount can be between 0 and 1%, with respect to the weight of the fluid.

The drilling fluid can furthermore comprise at least one fluid-loss additive. They are compounds which are adsorbed on the rocks constituting the walls of the well, for this reason limiting the diffusion through the walls of the boring of the various constituent components of the fluid. Mention may be made, as examples of compounds of this type, without the intention of being limited thereto, of cellulose compounds, polyacrylamides, polyacrylates of high molecular weight, succinoglycans, native starch or its derivatives, or carbon. Among cellulose compounds, unmodified celluloses or chemically modified celluloses, such as carboxymethylcelluloses, hydroxyethylcelluloses or carboxyethylhydroxyethylcelluloses, are compounds suitable as fluid-loss additive. Of course, there is nothing to prevent these products from being employed in combination, if the conditions render it necessary. The amount of fluid-loss additive generally depends on the nature of the rocks traversed. However, by way of indication, this amount can be between 0 and 1%, with respect to the total weight of the fluid. The drilling fluid can comprise an oxygen scavenger. The object of this type of additive is to trap the oxygen present in the drilling muds which can damage some additives. Mention may be made, among the products of this type, for example, of hydroxylamines, hydrazine, sulfites, bisulfites or dithionites. Preferably, use is made of hydrazine, which can be in an anhydrous or hydrated form, in the form of salts, such as, for example, the chloride or sulfate, or also in the carbohydrazide form. Generally, the content of additive of this type varies between 0 and 0.25% by weight of the fluid.

The drilling fluid can additionally comprise at least one weighting compound and/or at least one inorganic colloid. The weighting components contribute to maintaining a sufficient hydrostatic pressure in the well and to keeping in suspension the rocks entrained during the drilling operation. Such compounds are conventionally chosen from the soluble salts mentioned above and salts which are sparingly or very sparingly soluble. Mention may be made, among salts which are sparingly soluble, without intending to be limited thereto, of sulfates, silicates or carbonates of alkaline earth metals, such as barium sulfate or calcium carbonate. Use may likewise be made of bromides of alkaline earth metals or of zinc, such as potassium bromide or zinc bromide. Use may also be made of iron oxides or sulfide or subarsenate. Use may also be made of strontium sulfate, indeed even, in some cases of high density, of galena (lead sulfide).

The inorganic colloids, which are compounds substantially insoluble under the conditions of use of the fluid according to the invention, are agents which modify the rheology of the medium and which make it possible to keep the cuttings in suspension in the latter. Attapulgite, barite or bentonite, alone or as a mixture, are the most commonly used examples thereof. It should be noted that, if use is made of a fluid comprising an inorganic colloid, the latter will preferably be attapulgite.

The contents of weighting compounds and of inorganic colloids depend on several factors which are not solely technical. This is because, while these contents are very clearly determined according to the nature of the ground through which the well passes, the scale of the cost generated by the use of these additives is taken into account (presence or not on the spot, cost and the like).

It is also possible to add to the drilling fluid, if necessary, inorganic salts in order to promote the precipitation of certain ions, if they are present, in particular divalent ions. Mention may be made, for example, of the addition of sodium carbonate, in order to precipitate calcium, or sodium bicarbonate, in order to precipitate lime, in particular during redrilling operations in cement. Mention may also be made of the addition of gypsum or calcium chloride, in order to limit the swelling of clays, or the addition of calcium hydroxide or slaked lime, in order to remove bicarbonates from muds contaminated by carbon dioxide.

The content of salts depends on the rocks through which the well passes and on the water types available on the site of exploitation, and the operations can be carried out in the presence of fluids saturated with salts.

Very clearly, the drilling fluid can comprise standard additives from the category of polysaccharides of high molecular weight, such as succinoglycan, wellan or gellan, of use as viscosifying agents.

Other additives which are conventional in applications relating to the exploitation of oil and/or gas fields can participate in the composition of the fluid. Thus, mention may be made of agents for the transfer of free radicals, such as lower alcohols, thioureas or hydroquinone, biocides, chelating agents, surfactants, antifoaming agents or corrosion inhibitors, for example.

Other details or advantages of the invention will become more clearly apparent in the light of the examples below, without a limiting nature.

Other details or advantages of the invention may become apparent in the light of the examples which follow, without a limiting nature.

EXAMPLES

Example 1

Poly(SPP/Lauryl Methacrylate) 97/3 Mol/Mol

The synthesis takes place in two stages: preparation of an aqueous mixture comprising the monomers, followed by copolymerization.
Preparation of an Aqueous Mixture Comprising the Monomers:

4.3 g of lauryl methacrylate, 81.8 g of a 30% sodium dodecyl sulfate ("SDS") solution, 461.6 g of water and 9.9 g of sodium sulfate are added with magnetic stirring to a 1 liter glass beaker. Stirring is maintained until a clear micellar solution is obtained (mixture 1—aqueous fluid B). 161.2 g of SPP and 161.2 g of water are added with magnetic stirring to a 500 ml glass beaker. Stirring is maintained until a clear solution is obtained (mixture 2—aqueous solution A). Mixture 2 is subsequently introduced into mixture 1 with magnetic stirring. Stirring is maintained until a clear micellar solution is obtained (mixture 3). All these mixing stages take place at ambient temperature.
Total volume=1 l
n Lauryl methacrylate=0.017 mol
n SDS=0.085 mol
n SDS−cmc SDS=0.085−0.007×1=0.078 mol
$n_H$=13.5
Copolymerization:

100 g of water are added to a jacketed 1 liter glass reactor equipped with a mechanical stirrer, with a reflux condenser and with regulation of temperature via a heating bath. The temperature of the reaction medium is brought to 80° C. while flushing with nitrogen. Mixture 3, over 3 h, and a solution of 0.77 g of 2,2'-azobis(2-methylpropionamidine) dihydrochloride in 10 g of water, over 4 h 15, are then added simultaneously at 80° C. At the end of these additions, a solution of 0.46 g of 2,2'-azobis(2-methylpropionamidine) dihydrochloride in 10 g of water is added over 3 h. The reaction medium is subsequently cooled to ambient temperature.

Example 2

Poly(SPP/Lauryl Methacrylate) 99/1 Mol/Mol

The operation is carried out as in example 1.
Preparation of an Aqueous Mixture Comprising the Monomers (Mixture 3):
The following are employed for mixture 1:
  1.5 g of lauryl methacrylate,
  54.5 g of a 30% sodium dodecyl sulfate solution,
  469.6 g of water and 9.9 g of sodium sulfate.
The following are employed for mixture 2:
  172.2 g of SPP and 172.2 g of water.
Total volume=1 l
n Lauryl methacrylate=0.006 mol
n SDS=0.057 mol
n SDS−cmc SDS=0.057−0.007×1=0.050 mol
$n_H$=7.4
Copolymerization:

100 g of water are added to a jacketed 1 liter glass reactor equipped with a mechanical stirrer, with a reflux condenser and with regulation of temperature via a heating bath. The temperature of the reaction medium is brought to 80° C. while flushing with nitrogen. Mixture 3, over 3 h, and a solution of 0.81 g of 2,2'-azobis(2-methylpropionamidine) dihydrochloride in 10 g of water, over 4 h 15, are then added simultaneously at 80° C. At the end of these additions, a solution of 0.48 g of 2,2'-azobis(2-methylpropionamidine) dihydrochloride in 10 g of water is added over 3 h. The reaction medium is subsequently cooled to ambient temperature.

Example 3

Poly(SPP/Purified Plex 6877-O) 99/1 Mol/Mol

The operation is carried out as in example 1.
Preparation of an Aqueous Mixture Comprising the Monomers (Mixture 3):
The following are employed for mixture 1:
  9.3 g of Plex 6877-O purified by removal of the methyl methacrylate,
  4.1 g of a 30% sodium dodecyl sulfate solution,
  487.7 g of water.
The following are employed for mixture 2:
  189.4 g of SPP and 189.4 g of water.
Copolymerization:

100 g of water are added to a jacketed 1 liter glass reactor equipped with a mechanical stirrer, with a reflux condenser and with regulation of temperature via a heating bath. The temperature of the reaction medium is brought to 80° C. while flushing with nitrogen. Mixture 3, over 3 h, and a solution of 0.89 g of 2,2'-azobis(2-methylpropionamidine) dihydrochloride in 10 g of water, over 4 h 15, are then added simultaneously at 80° C. At the end of these additions, a solution of 0.53 g of 2,2'-azobis(2-methylpropionamidine) dihydrochloride in 10 g of water is added over 3 h. The reaction medium is subsequently cooled to ambient temperature.

Example 4

Poly(SPP/Lauryl Methacrylate) 99/1 Mol/Mol Prepared in the Presence of 2 Parts by Weight of Heptane Per 1 Part by Weight of Lauryl Methacrylate This example is substantially similar to example 1 with partial replacement of the lauryl methacrylate by heptane.
The operation is carried out as in example 1.
Preparation of an Aqueous Mixture Comprising the Monomers (Mixture 3):
The following are employed for mixture 1:
  0.5 g of lauryl methacrylate,
  1 g of heptane,
  54.5 g of a 30% sodium dodecyl sulfate solution,
  469.6 g of water,
  9.9 g of sodium sulfate.
The following are employed for mixture 2:
  172.2 g of SPP and 172.2 g of water.
Total volume=1 l
n Lauryl methacrylate=0.002 mol
n SDS=0.057 mol
n SDS−cmc SDS=0.057−0.007×1=0.050 mol
$n_H$=2.5
Copolymerization:

100 g of water are added to a jacketed 1 liter glass reactor equipped with a mechanical stirrer, with a reflux condenser and with regulation of temperature via a heating bath. The temperature of the reaction medium is brought to 80° C. while flushing with nitrogen. Mixture 3, over 3 h, and a solution of 0.81 g of 2,2'-azobis(2-methylpropionamidine) dihydrochloride in 10 g of water, over 4 h 15, are then added simultaneously at 80° C. At the end of these additions, a solution of 0.48 g of 2,2'-azobis(2-methylpropionamidine) dihydrochloride in 10 g of water is added over 3 h. The reaction medium is subsequently cooled to ambient temperature.

Example 5

Poly(SPP/Acrylamide/Lauryl Methacrylate) 29.5/67.5/3 Mol/Mol/Mol

The operation is carried out as in example 1.
Preparation of an Aqueous Mixture Comprising the Monomers (Mixture 3):
The following are employed for mixture 1:
3.9 g of lauryl methacrylate,
73.1 g of a 30% sodium dodecyl sulfate solution,
220.1 g of water and 5.4 g of sodium sulfate.
The following are employed for mixture 2:
57 g of SPP and 57 g of water,
63.5 g of a 50% aqueous acrylamide solution.
Total volume=0.544 l
n Lauryl methacrylate=0.015 mol
n SDS=0.076 mol
n SDS−cmc SDS=0.076−0.007×0.544=0.072 mol
$n_H$=12.9
Copolymerization:
100 g of water are added to a jacketed 1 liter glass reactor equipped with a mechanical stirrer, with a reflux condenser and with regulation of temperature via a heating bath. The temperature of the reaction medium is brought to 80° C. while flushing with nitrogen. Mixture 3, over 3 h, and a solution of 0.9 g of 2,2'-azobis(2-methylpropionamidine) dihydrochloride in 10 g of water, over 4 h 15, are then added simultaneously at 80° C. At the end of these additions, a solution of 0.54 g of 2,2'-azobis(2-methylpropionamidine) dihydrochloride in 10 g of water is added over 3 h. The reaction medium is subsequently cooled to ambient temperature.

Example 6

Comparative

Poly(SPP/Lauryl Methacrylate) 97/3 Mol/Mol

The synthesis takes place in two stages: preparation of an aqueous mixture comprising the monomers, followed by copolymerization.
Preparation of an Aqueous Mixture Comprising the Monomers:
3 g of lauryl methacrylate, 510 g of a 30% sodium dodecyl sulfate solution, 323.3 g of water and 6.9 g of sodium sulfate are added with magnetic stirring to a 1 liter glass beaker. Stirring is maintained until a clear micellar solution is obtained (mixture 1—aqueous fluid B). 112.9 g of SPP and 112.9 g of water are added with magnetic stirring to a 500 ml glass beaker. Stirring is maintained until a clear solution is obtained (mixture 2—aqueous solution A). Mixture 2 is subsequently introduced into mixture 1 with magnetic stirring. Stirring is maintained until a clear micellar solution is obtained (mixture 3). All these mixing stages take place at ambient temperature.
Total volume=1.084 l
n Lauryl methacrylate=0.0118 mol
n SDS=0.531 mol
n SDS−cmc SDS=0.531−0.007×1.084=0.523 mol
$n_H$=1.4

Copolymerization:
70 g of water are added to a jacketed 1 liter glass reactor equipped with a mechanical stirrer, with a reflux condenser and with regulation of temperature via a heating bath. The temperature of the reaction medium is brought to 80° C. while flushing with nitrogen. Mixture 3, over 3 h, and a solution of 0.54 g of 2,2'-azobis(2-methylpropionamidine) dihydrochloride in 7 g of water, over 4 h 15, are then added simultaneously at 80° C. At the end of these additions, a solution of 0.32 g of 2,2'-azobis(2-methylpropionamidine) dihydrochloride in 7 g of water is added over 3 h. The reaction medium is subsequently cooled to ambient temperature.
The final product exhibits a viscosity similar to that of water.

Example 7

Comparative

Poly(SPE/Acrylamide/n-Octylacrylamide) 5/94/1 Mol/Mol/Mol—Prepared According to the Prior Art Example 1 of U.S. Pat. No. 4,742,135 (Exxon) is reproduced.
470 g of water, 12.1 g of acrylamide, 0.33 g of n-octylacrylamide, 15.8 g of sodium dodecyl sulfate and 2.45 g of SPE are added to a jacketed 1 liter glass reactor equipped with a mechanical stirrer, a reflux condenser and temperature regulation by a heating bath.
Total volume=0.5 l
n-octylacrylamide=0.0018 mol
n SDS=0.055 mol
n SDS−cmc SDS=0.055−0.007×0.5=0.525 mol
$n_H$=2.1
The temperature of the reaction medium is brought to 50° C. while flushing with nitrogen. 0.01 g of potassium persulfate is then added at 50° C. Heating, stirring and nitrogen flushing are maintained for 24 h. The reaction medium is subsequently cooled to ambient temperature. The final product is analyzed by NMR and GPC. It does not exhibit polymer and exhibits no significant property.
In order to attempt to obtain a polymer, the test is then continued beyond the teachings of the prior art:
The reaction medium is then again placed under stirring and nitrogen flushing. The temperature of the medium is brought to 75° C. for 24 h. The resulting product still does not exhibit polymer. In order to continue, 0.1 g of potassium persulfate is added to the reaction medium and the temperature is maintained at 75° C. for 24 h while flushing with nitrogen. The final product has a yield of 100% of polymer and does not exhibit a significant property (the viscosity is evaluated by shaking; it is so low that it is pointless to measure it).

Example 8

Comparative Study on the Copolymer of Example 1 and of Example 4

The copolymers of examples 1 ($n_H$=13.5) and 4 ($n_H$=2.5) are compared. Each copolymer is purified in Spectra Por© membranes, by dialysis against frequently replenished deionized water for 2 weeks, in order to remove therefrom any other compound than the copolymers themselves (salts, SDS surfactant). The pure copolymer is subsequently obtained in the powder form by drying, in an oven at 90° C., the offwhite dispersions obtained at the end of dialysis inside the membranes.

Each copolymer is subsequently dissolved in formamide, and static light scattering experiments provide the weight-average molecular weights Mw of the polymer chains synthesized, by virtue of the Zimm plot method.

FIG. 1 represents the Zimm plot obtained for the polymer of example 1.

Figure 2:
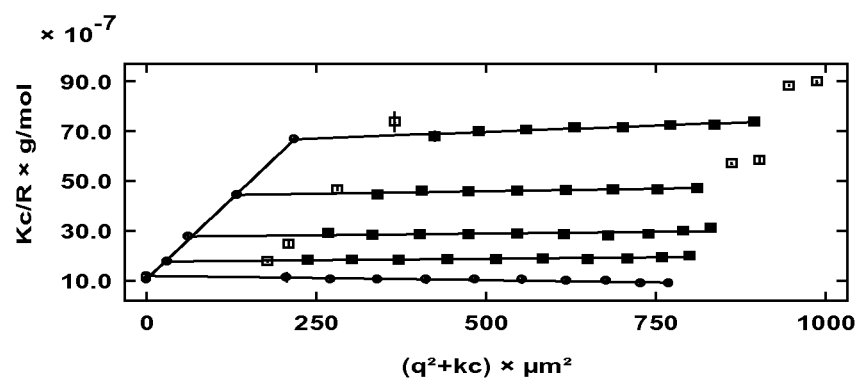
FIG. 2 depicts the Zimm plot obtained for the polymer of Example 4.

FIG. 2 represents the Zimm plot obtained for the polymer of example 4.

The range of concentrations by weight in which the static light scattering studies were carried out and the weight-average molecular weight measurement which results from the Zimm plot are given in table 1 below. It is seen that the copolymers have substantially the same weight-average molecular weight Mw, despite very different $n_H$ values.

TABLE 1

| Reference | Molar fraction of hydrophobic units | Range of concentrations studied (wt %) | Mw (kg/mol$^{-1}$) |
|---|---|---|---|
| Example 1 | 3% | 0.25, 0.5, 1, 1.5 and 2 | 850 ± 50 |
| Example 4 | 1% | 0.25, 0.5, 1, 1.5 and 2 | 950 ± 50 |

The rheological performances of the copolymers of examples 1 and 4, which have a substantially identical molecular weight but different $n_H$ values, are subsequently compared.

A dispersion of each of the two copolymers of examples 1 and 4 is prepared according to the following prescription:

44.5 g of deionized water 2.92 g of sodium chloride NaCl 2.50 g of dry purified copolymer 0.10 g of sodium dodecyl sulfate (SDS)

which corresponds to a concentration of salt of 1 mol/l and a concentration by weight of copolymer of 5%.

The solutions are stirred using a magnetic bar and are placed on a magnetic stirrer for 24 hours before their viscosity is measured, over a given range of shear gradients, using an AR2000 rheometer (TA Instruments, Surrey, United Kingdom) equipped with a geometry of cone-plate type (radius=60 mm; angle between plate and cone α=2; gap=54 μm; type of substrate: steel). The viscosity values at different shear gradients are given in table 2.

The copolymer of example 1 with a high $n_H$ value (=13.5) exhibits viscosities ranging from several hundred to several thousand times the viscosity of pure water (1 cP); it is thus described as viscous.

The copolymer of example 4 with a low $n_H$ value (=2.5) exhibits viscosities of the order of approximately ten cP and is thus described as liquid.

TABLE 2

| Reference | Shear gradient (s$^{-1}$) | Viscosity (cP) |
|---|---|---|
| Example 1 | 5 | 8000 |
|  | 10 | 4000 |
|  | 30 | 1600 |
|  | 50 | 800 |
| Example 4 | 5 | 10 |
|  | 10 | 10 |
|  | 30 | 10 |
|  | 50 | 10 |

Example 9

Tests and Use

The polymers, the syntheses of which are described in examples 1, 3 and 5, are used in different brines with the following compositions:

NaBr (44.6%): density 1.5 (referenced NaBr)

CaCl$_2$ (23%)+CaBr$_2$ (33%): density 1.7 (referenced CaCl$_2$/CaBr$_2$)

CaBr$_2$ (23%)+ZnBr$_2$ (53%): density 2.3 (referenced CaBr$_2$/ZnBr$_2$)

The viscosities of the solutions of polymers in the brines are measured at a gradient of 100 s$^{-1}$ using an AR2000 rheometer (TA Instruments, Surrey, United Kingdom) equipped with a geometry of Couette type (internal radius=14 mm; external radius=15 mm and height=42 mm).

The polymer of example 1 exhibits, in the NaBr brine, an advantageous viscosity at 25° C. and at 90° C., in particular starting from a concentration by weight of 1.5-2% or more (see table 3).

TABLE 3

| Polymer | Concentration (%) | Viscosity (25° C.) | Viscosity (90° C.) |
|---|---|---|---|
| Example 1 | 1.5 | 25 | 9.8 |
| Example 1 | 2 | 70 | 40 |
| Example 1 | 3 | 210 | 130 |

The polymer of example 3 exhibits, in the NaBr brine and the CaCl$_2$/CaBr$_2$ brine, an advantageous viscosity at 25° C. and at 90° C., in particular from a concentration by weight of 1-2% or more (see table 4).

TABLE 4

| | | NaBr | | CaCl$_2$/CaBr$_2$ | |
|---|---|---|---|---|---|
| Polymer | Conc. (%) | Viscosity (25° C.) | Viscosity (90° C.) | Viscosity (25° C.) | Viscosity (90° C.) |
| Example 3 | 1 | 15 | 3.5 | 27 | 12 |
| Example 3 | 2 | 79 | 31 | 82 | 31 |
| Example 3 | 3 | 284 | 177 | 257 | 86 |
| Example 3 | 5 | 617 | 551 | 875 | 395 |

The polymer of example 5 exhibits, in the NaBr brine and the CaCl$_2$/CaBr$_2$ brine, a viscosity advantageous in the application, in particular from a concentration by weight of 0.5-1% or more. In the CaBr$_2$/ZnBr$_2$ brine, a concentration of 0.14-0.5% by weight or more makes it possible to already obtain a satisfactory viscosity (see table 5).

TABLE 5

| Polymer | Conc. (%) | NaBr Visco. (100 s$^{-1}$ 25° C.) (cP) | CaCl$_2$/CaBr$_2$ Visco. (100 s$^{-1}$ 25° C.) (cP) | CaBr$_2$/ZnBr$_2$ Visco. (100 s$^{-1}$ 25° C.) (cP) |
|---|---|---|---|---|
| Example 5 | 0.07 | / | / | 30.3 |
| Example 5 | 0.14 | 3.2 | 9.5 | 38 |
| Example 5 | 0.28 | 5.2 | 14.3 | 61 |
| Example 5 | 0.56 | 15.3 | 40 | 173 |
| Example 5 | 1 | 119 | 304 | 998 |

The introduction of the polymer of example 5 into a brine makes it possible to slow down the sedimentation of particles and thus to improve their transportation.

The results presented in table 6 below are produced with a suspension comprising 20% by volume of sand particles (supplied by Sifraco, reference BB 0.8/1.8), with a density of 2.65 and a mean diameter of 1.2 mm, in a $CaCl_2/CaBr_2$ brine with a density of 1.7.

TABLE 6

| Polymer | Polymer concentration (% by weight) | Sedimentation rate (cm/min) |
|---|---|---|
|  | 0 | 187 |
| Example 5 | 0.13 | 142 |
| Example 5 | 0.26 | 102 |
| Example 5 | 0.37 | 82 |
| Example 5 | 0.48 | 62 |
| Example 5 | 0.65 | 30 |
| Example 5 | 0.81 | 16 |
| Example 5 | 0.90 | 8 |
| Example 5 | 1.00 | 2 |

Example 10

Evaluation of the Viscosity Under Dynamic Conditions—Measurement of G' and of G"

The copolymer of example 1 ($n_H$=13.5) is studied under different conditions of salinity. Formulations of this copolymer are prepared according to the prescriptions known as prescriptions 3, 4 and 5 below:

Prescription 3
  57.4 g of deionized water
  2.50 g of dry purified copolymer
  0.10 g of sodium dodecyl sulfate (SDS)

This prescription corresponds to a concentration of salt of $C_{NaCl}$=0 mol/l and to a concentration by weight of copolymer of 5%.

Prescription 4
  41.5 g of deionized water
  5.86 g of sodium chloride NaCl
  2.50 g of dry purified copolymer
  0.10 g of sodium dodecyl sulfate (SDS)

This prescription corresponds to a concentration of salt of $C_{NaCl}$=2 mol/l and to a concentration by weight of copolymer of 5%.

Prescription 5
  38.6 g of deionized water
  8.76 g of sodium chloride NaCl
  2.50 g of dry purified copolymer
  0.10 g of sodium dodecyl sulfate (SDS)

This prescription corresponds to a concentration of salt of $C_{NaCl}$=3 mol/l and to a concentration by weight of copolymer of 5%.

The solutions are stirred with a magnetic bar and placed on a magnetic stirrer for 24 hours before their elastic moduli (G') and loss moduli (G") are measured using an AR2000 rheometer (TA Instruments, Surrey, United Kingdom), equipped with a geometry of cone-plate type (radius=60 mm; angle between plate and cone $\alpha$=2°; gap=54 μm; type of substrate: steel), as a function of the strain ("% strain") at a frequency set at 1 Hz at 25° C.

Figure 3:
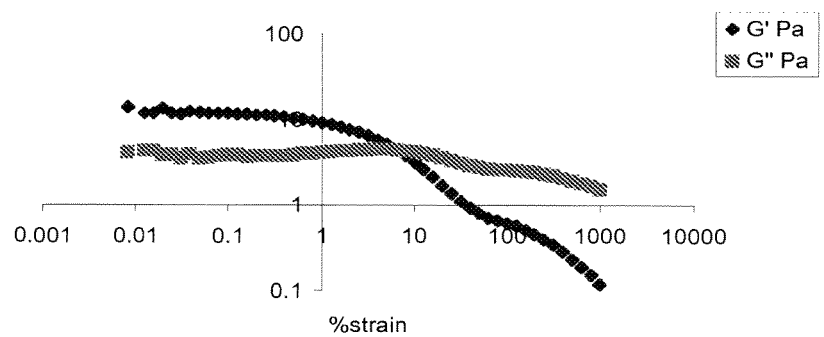
FIG. 3 depicts the curves for elastic modulus (G') and loss modulus (G") (in Pa.s) as a function of the strain ("%strain") for the dispersion corresponding to prescription 3 of Example 10.
Figure 4:
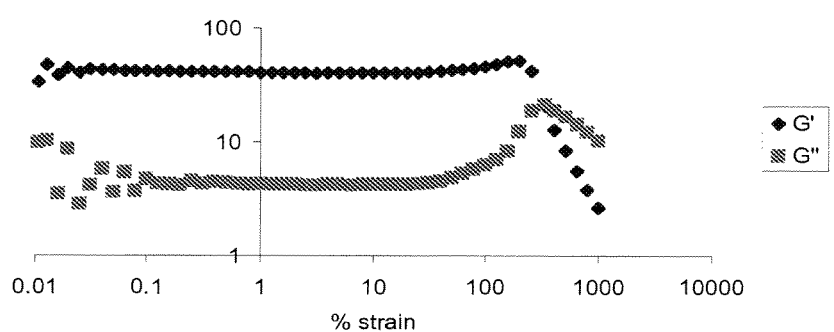
FIG. 4 depicts the cuvres for elastic modulus (G') and loss modulus (G") (in Pa.s) as a function of the strain ("%strain") for the dispersion corresponding to prescription 4 of Example 10.
Figure 5:
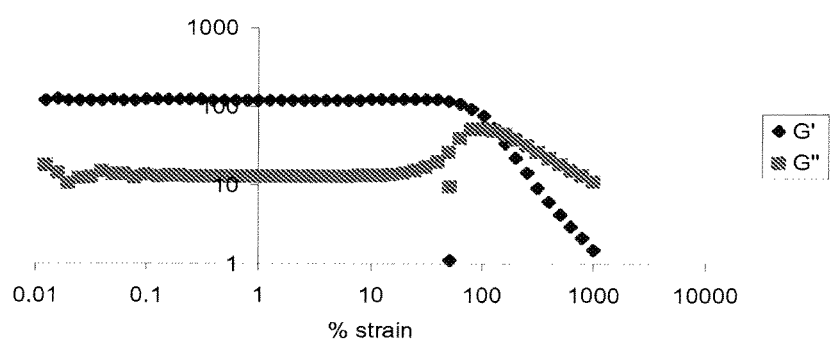
FIG. 5 depicts the curves for elastic modulus (G') and loss modulus (G") (in Pa.s) as a function of the strain ("%strain") for the dispersion corresponding to prescription 5 of Example 10.

The curves for G' and G" (in Pa·s) as a function of the strain ("% strain") for the dispersions corresponding to the 3 prescriptions: prescription 3, prescription 4 and prescription 5, are shown respectively in FIGS. 3, 4 and 5 below.

 The formulations according to the 3 prescriptions are gels: the elastic modulus G' is constant and greater than the loss modulus G" over a relatively broad strain range ranging up to 10 to 100%. Furthermore, the greater the level of salt, the greater the elastic modulus at a constant concentration of copolymer:
  for $c_{NaCl}$=0 mol/l (prescription 1), G' is approximately 10 Pa·s
  for $c_{NaCl}$=2 mol/l (prescription 2), G' is approximately 50 Pa·s
  for $c_{NaCl}$=3 mol/l (prescription 3), G' is approximately 100 Pa·s

What is claimed is:

1. A process for the preparation of a copolymer comprising:
   a) preparing an aqueous fluid B comprising:
      at least one ethylenically unsaturated monomer B, wherein monomer B is hydrophobic ($B_{phobic}$) and/or amphiphilic ($B_{amphi}$), and
      optionally a surfactant,
      wherein, if the monomer B is a hydrophobic monomer $B_{phobic}$, then the aqueous fluid B comprises a surfactant,
      wherein monomer B is included in micelles comprising surfactant and/or monomer $B_{amphi}$,
      wherein:
         the number of monomers in the micelles is greater than 2.6;
         the ratio in moles of the surfactant to the monomer B is less than or equal to 28; and/or
         the ratio by weight of the surfactant, if present, to the monomer B is less than or equal to 30
   b) carrying out a polymerization by combining in an aqueous medium:
      the micelles of the aqueous fluid B,
      monomers $A_Z$ or $A_{Z\,precursor}$ and optionally other hydrophilic monomers $A_{other}$ dissolved in an aqueous medium,
      wherein:
         monomers $A_Z$ comprise a betaine group, said betaine group comprising a cationic group and an anionic group,
         monomers $A_{Z\,precursor}$ comprise a precursor capable of forming betaine groups $A_Z$ by a reaction subsequent to the polymerization, and
         a source of free radicals; and
   c) optionally converting $A_{Z\,precursor}$ to betaine groups $A_Z$ if present.

2. The process of claim 1, wherein the combined molar ratio of monomers $A_Z$, $A_{Z\,precursor}$, and $A_{other}$ to monomers B ranges from 1/99 to 99.9/0.1.

3. The process of claim 1, wherein the molar ratio of the monomers $A_Z$ or $A_{Z\,precursor}$ to monomers $A_{other}$ ranges from 99/1 to 1/99.

4. The process of claim 1, wherein the betaine monomer $A_Z$ comprises:
   alkylsulfonates or phosphonates of dialkylammonioalkyl acrylates, methacrylates, acrylamides, or methacrylamides,
   heterocyclic betaine monomers,
   alkylsulfonates or phosphonates of dialkylammonioalkylallylics,
   alkylsulfonates or phosphonates of dialkylammonioalkylstyrenes,
   betaines resulting from ethylenically unsaturated anhydrides or dienes,
   phosphobetaines of formulae:

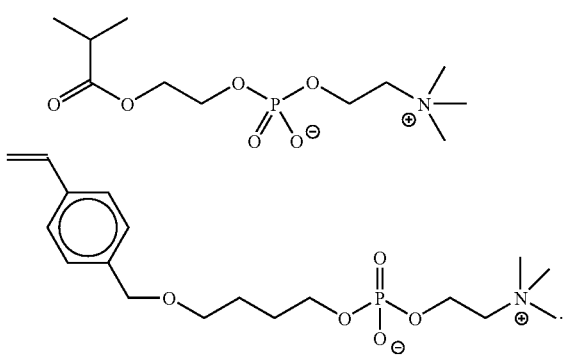

or mixtures thereof.

5. The process of claim 1, wherein the betaine monomer $A_Z$ comprises:

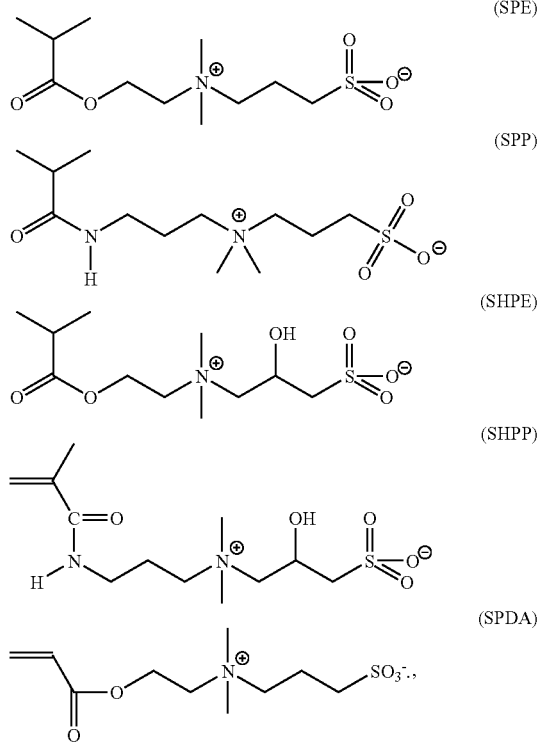

or
mixtures thereof.

6. The process of claim 1, wherein monomer $A_{other}$ comprises neutral monomers $A_N$, cationic or potentially cationic monomers $A_C$, anionic or potentially anionic monomers $A_A$, or mixtures thereof.

7. The process of claim 6, wherein monomer $A_N$ comprises:
hydroxyalkyl esters of α,β-ethylenically unsaturated acids,
α,β-ethylenically unsaturated amides,
α,β-ethylenically unsaturated monomers comprising a water-soluble polyoxyalkylene segment,
vinyl alcohol,
vinyllactams,
α,β-ethylenically unsaturated ureido monomers, or mixtures thereof.

8. The process of claim 6, wherein monomer $A_N$ comprises:
hydroxyethyl acrylate, hydroxyethyl methacrylate, hydroxypropyl acrylate, hydroxypropyl methacrylate, or glycerol monomethacrylate;
acrylamide, methacrylamide, N-methylolacrylamide, dimethylacrylamide, or dimethylmethacrylamide;
vinylpyrrolidone;
the methacrylamido of 2-imidazolidinone ethyl, or mixtures thereof.

9. The process of claim 6, wherein monomer $A_A$ comprises:
monomers comprising at least one carboxyl functional group or their water-soluble salts;
monomers comprising at least one sulfate or sulfonate functional group or a corresponding acid functional group;
monomers comprising at least one phosphonate or phosphate functional group or a corresponding acid functional group; or
mixtures thereof.

10. The process of claim 6, wherein monomer $A_A$ comprises:
acrylic acid, acrylic anhydride, methacrylic acid, methacrylic anhydride, maleic acid, maleic anhydride, fumaric acid, itaconic acid, N-methacryloylalanine, N-acryloylglycine, or their water-soluble salts;
2-sulfooxyethyl methacrylate, vinylbenzenesulfonic acid, allylsulfonic acid, 2-acrylamido-2-methylpropanesulfonic acid, sulfoethyl acrylate or methacrylate, sulfopropyl acrylate or methacrylate, and their water-soluble salts;
vinylphosphonic acid or ethylenically unsaturated phosphate esters; or
mixtures thereof.

11. The process of claim 1, wherein hydrophobic monomer $B_{phobic}$ comprises
vinylaromatic monomers,
vinyl halides,
vinylidene halides,
$C_1$-$C_{30}$ alkyl esters of α,β-monoethylenically unsaturated acids,
carboxylic acid vinyl esters,
carboxylic acid allyl esters,
α,β-monoethylenically unsaturated nitriles comprising from 3 to 12 carbon atoms,
α-olefins,
conjugated dienes, or
mixtures thereof.

12. The process of claim 11, wherein hydrophobic monomer $B_{phobic}$ comprises:
styrene, α-methylstyrene, para-chloromethylstyrene, or vinyltoluene;
vinyl chloride or vinylidene chloride;
methyl acrylate, ethyl acrylate, butyl acrylate, 2-ethylhexyl acrylate, isooctyl acrylate, lauryl acrylate, isodecyl acrylate, stearyl acrylate, methyl methacrylate, ethyl methacrylate, butyl methacrylate, 2-ethylhexyl methacrylate, isooctyl methacrylate, lauryl methacrylate, isodecyl methacrylate, or stearyl methacrylate;
vinyl acetate, allyl acetate, vinyl propionate, allyl propionate, vinyl versatate, allyl versatate, vinyl stearate, or allyl stearate;
acrylonitrile or methacrylonitrile; or
mixtures thereof.

13. The process of claim 1, wherein amphiphilic monomer $B_{amphi}$ comprises:
- acrylates or methacrylates of polyethoxylated and/or polypropoxylated $C_3$-$C_{30}$ aliphatic alcohols, wherein the aliphatic portion is optionally substituted by one or more hydroxyl groups;
- acrylates or methacrylates of polyethoxylated and/or polypropoxylated polystyrylphenols;
- acrylates or methacrylates of polyethoxylated and/or polypropoxylated alkylphenols; or
- mixtures thereof.

14. The process of claim 1, wherein aqueous fluid B comprises an anionic surfactant, nonionic surfactant, or mixtures thereof.

15. The process of claim 14, wherein the surfactant comprises an alkyl sulfate, an alkylsulfonate, an alkylaryl sulfate, an alkylarylsulfonate, or mixtures thereof.

16. The process of claim 1, wherein the step of carrying out a polymerization additionally comprises:
- b1) preparing an aqueous solution A comprising the monomers $A_Z$ or $A_{Z\,precursor}$ and optionally a salt,
- b2) combining at least a portion of the aqueous solution A, at least a portion of the aqueous fluid B, and at least a portion of the source of free radicals,
- b3) carrying out polymerization by generating free radicals in the reaction mixture, optionally with heating, and
- b4) combining any remaining portions of aqueous solution A, aqueous fluid B, and/or the source of free radicals, all at once or continuously.

17. The process of claim 1, wherein the step of carrying out polymerization is semi-batchwise.

18. The process of claim 17, further comprising:
- i) preparing aqueous fluid B;
- ii) preparing aqueous solution A;
- iii) mixing the aqueous fluid B and the aqueous solution A to obtain a premix;
- iv) preparing a vessel heel in a reactor, the vessel heel comprising a portion of the premix and the source of free radicals;
- v) initiating the polymerization by heating;
- vi) adding continuously the remaining premix while heating; and
- vii) adding the source of free radicals, in all or in part, into the premix or into the vessel heel, wherein any remaining portion of the source of free radicals is optionally added continuously during stage vi.

19. The process of claim 17, wherein the process further comprises:
- i) preparing aqueous fluid B;
- ii) preparing aqueous solution A;
- iii) mixing the aqueous fluid B and the aqueous solution A to obtain a premix;
- iv) preparing a vessel heel in a reactor, the vessel heel comprising water and optionally surfactant;
- v) adding the premix continuously while heating; and
- vi) adding the source of free radicals, it all or in part, into the premix or separately into the vessel heel, wherein any remaining portion of the source of free radicals is optionally added continuously.

20. A method of thickening and/or modifying the rheology of an aqueous composition, comprising adding a copolymer made by the process of claim 1 to said aqueous composition.

21. The method of claim 20, wherein the aqueous composition comprises a saline composition comprising at least 35 g/L of a salt, or a composition based on seawater or brine that exhibits an ionic strength of at least 0.7 mol/L.

22. The method of claim 20, wherein the aqueous composition is adapted for use as:
- a fluid for the extraction of oil and/or gas;
- a fluid for civil engineering, for excavation, and/or for digging operations;
- a household care composition; or
- a cosmetic composition.

23. The method of claim 22, wherein the aqueous composition is a fluid adapted for the extraction of oil and/or gas comprising:
- a drilling fluid,
- a completion fluid,
- a fracturing fluid,
- a gravel packing fluid,
- a production fluid, or
- an enhanced oil recovery fluid.

* * * * *

UNITED STATES PATENT AND TRADEMARK OFFICE
CERTIFICATE OF CORRECTION

PATENT NO.        : 8,637,622 B2                                      Page 1 of 1
APPLICATION NO.   : 12/594558
DATED             : January 28, 2014
INVENTOR(S)       : Monin et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 983 days.

Signed and Sealed this
Twenty-second Day of September, 2015

Michelle K. Lee
*Director of the United States Patent and Trademark Office*